(12) United States Patent
Hamstra et al.

(10) Patent No.: US 10,180,268 B2
(45) Date of Patent: Jan. 15, 2019

(54) ENERGY CHASSIS AND ENERGY EXCHANGE DEVICE

(71) Applicant: Greensleeves, LLC, Findlay, OH (US)

(72) Inventors: Stephen A. Hamstra, Zeeland, MI (US); W. Michael Linn, Winter Springs, FL (US)

(73) Assignee: Greensleeves, LLC, Findlay, OH (US)

( * ) Notice: Subject to any disclaimer, the term of this patent is extended or adjusted under 35 U.S.C. 154(b) by 370 days.

(21) Appl. No.: 14/798,406

(22) Filed: Jul. 13, 2015

(65) Prior Publication Data

US 2015/0316295 A1 Nov. 5, 2015

Related U.S. Application Data

(63) Continuation of application No. 13/101,771, filed on May 5, 2011, now Pat. No. 9,080,789.

(Continued)

(51) Int. Cl.
*G06F 19/00* (2018.01)
*F24T 10/00* (2018.01)
(Continued)

(52) U.S. Cl.
CPC .............. *F24T 10/00* (2018.05); *F24D 12/02* (2013.01); *F24D 19/1048* (2013.01); *F28D 20/00* (2013.01); *G06Q 10/04* (2013.01); *G06Q 50/06* (2013.01); *H02J 3/14* (2013.01); *F24D 2200/11* (2013.01); *F24D 2200/12* (2013.01); *F24D 2200/22* (2013.01); *F24F 11/46* (2018.01); *F24F 2005/0057* (2013.01); *F24T 2010/56* (2018.05); *F24T 2201/00* (2018.05);

(Continued)

(58) Field of Classification Search
CPC combination set(s) only.
See application file for complete search history.

(56) References Cited

U.S. PATENT DOCUMENTS 2,154,263 A 4/1939 Carrier
3,729,051 A 4/1973 Mannion
(Continued)

FOREIGN PATENT DOCUMENTS

CN 2783217 Y 5/2006
CN 101004331 A 7/2007
(Continued)

OTHER PUBLICATIONS

Hackel, Scott P.; Development of Design Guidelines for Hybrid Ground-Coupled Heat Pump Systems; Master of Science thesis submitted at the University of Wisconsin-Madison; May 2008.
(Continued)

Primary Examiner — Kidest Bahta
(74) Attorney, Agent, or Firm — Shay Glenn LLP

(57) ABSTRACT

Systems, methods and devices for utilizing an energy chassis device designed to sense, collect, store and distribute energy from where it is available using devices that harvest or convert energy to locations requiring energy such as but not limited to HVAC (heating, ventilation and cooling) systems. The systems, methods and devices can also be used with a next generation geothermal heat exchanger that achieves higher energy harvesting efficiency and provides greater functionality than current geothermal exchangers.

20 Claims, 18 Drawing Sheets

Related U.S. Application Data

(60) Provisional application No. 61/331,525, filed on May 5, 2010.

(51) Int. Cl.

| | | |
|---|---|---|
| *F24D 12/02* | (2006.01) | |
| *F24D 19/10* | (2006.01) | |
| *F28D 20/00* | (2006.01) | |
| *H02J 3/14* | (2006.01) | |
| *G06Q 10/04* | (2012.01) | |
| *G06Q 50/06* | (2012.01) | |
| *F24F 5/00* | (2006.01) | |
| *F24F 11/46* | (2018.01) | |

(52) U.S. Cl.
CPC .......... *F28F 2200/00* (2013.01); *Y02B 10/40* (2013.01); *Y02B 10/70* (2013.01); *Y02B 30/14* (2013.01); *Y02B 30/52* (2013.01); *Y02B 30/762* (2013.01); *Y02B 70/3225* (2013.01); *Y02B 70/3275* (2013.01); *Y02E 10/12* (2013.01); *Y02E 60/142* (2013.01); *Y02E 70/30* (2013.01); *Y04S 20/222* (2013.01); *Y04S 20/244* (2013.01)

(56) References Cited

U.S. PATENT DOCUMENTS

| | | |
|---|---|---|
| 4,304,294 A | 12/1981 | Reisman |
| 4,360,056 A | 11/1982 | O'Connell |
| 4,375,806 A | 3/1983 | Nishman |
| 4,909,312 A | 3/1990 | Biedenbach et al. |
| 5,224,357 A | 7/1993 | Galiyano et al. |
| 5,244,037 A | 9/1993 | Warnke |
| 5,274,571 A | 12/1993 | Hesse et al. |
| 5,323,843 A | 6/1994 | Olszewski et al. |
| 5,467,265 A | 11/1995 | Yamada et al. |
| 5,479,358 A | 12/1995 | Shimoda et al. |
| 5,564,282 A | 10/1996 | Kaye |
| 5,671,608 A | 9/1997 | Wiggs et al. |
| 5,706,888 A | 1/1998 | Ambs et al. |
| 5,778,683 A | 7/1998 | Drees et al. |
| 5,934,369 A | 8/1999 | Dosani et al. |
| 5,937,665 A | 8/1999 | Kiessel et al. |
| 5,992,507 A | 11/1999 | Peterson et al. |
| 6,250,371 B1 | 6/2001 | Amerman et al. |
| 6,250,560 B1 | 6/2001 | Kline et al. |
| 6,276,438 B1 | 8/2001 | Amerman et al. |
| 6,959,520 B2 * | 11/2005 | Hartman ............... E04B 7/024 52/838 |
| 7,228,696 B2 | 6/2007 | Ambs et al. |
| 7,407,003 B2 | 8/2008 | Ross |
| 7,647,773 B1 | 1/2010 | Koenig |
| 7,894,943 B2 | 2/2011 | Sloup et al. |
| 8,219,250 B2 | 7/2012 | Dempster et al. |
| 8,291,720 B2 | 10/2012 | Hartman |
| 8,346,398 B2 | 1/2013 | Ahmed et al. |
| 8,378,280 B2 | 2/2013 | Mills et al. |
| 8,571,832 B2 | 10/2013 | Raman et al. |
| 8,851,066 B1 * | 10/2014 | Kapteyn .................. F24J 2/34 126/620 |
| 9,080,789 B2 | 7/2015 | Hamstra et al. |
| 9,360,236 B2 * | 6/2016 | Stewart |
| 9,709,337 B2 | 7/2017 | Pilebro et al. |
| 2004/0123550 A1 * | 7/2004 | Hartman ............... E04B 7/024 52/831 |
| 2004/0206085 A1 | 10/2004 | Koenig et al. |
| 2004/0267408 A1 | 12/2004 | Kramer |
| 2006/0048770 A1 | 3/2006 | Meksvanh et al. |
| 2007/0017667 A1 | 1/2007 | Weng |
| 2007/0179917 A1 | 8/2007 | Patel et al. |
| 2007/0192078 A1 | 8/2007 | Nasle et al. |
| 2007/0235179 A1 | 10/2007 | Phillips |
| 2007/0295477 A1 | 12/2007 | Mueller et al. |
| 2008/0230205 A1 | 9/2008 | Seguin et al. |
| 2009/0019876 A1 | 1/2009 | Guglietti et al. |
| 2009/0095477 A1 | 4/2009 | Nguyen et al. |
| 2009/0194257 A1 | 8/2009 | Niu et al. |
| 2009/0287355 A1 | 11/2009 | Milder et al. |
| 2009/0307636 A1 | 12/2009 | Cases et al. |
| 2010/0200191 A1 | 8/2010 | Livingston |
| 2010/0223171 A1 | 9/2010 | Bailer |
| 2011/0125451 A1 | 5/2011 | Cheifetz et al. |
| 2011/0153103 A1 | 6/2011 | Brown et al. |
| 2011/0220320 A1 | 9/2011 | Kidwell |
| 2012/0072181 A1 | 3/2012 | Imani |
| 2012/0232701 A1 | 9/2012 | Carty et al. |
| 2012/0271462 A1 | 10/2012 | Dempster et al. |
| 2013/0013121 A1 | 1/2013 | Henze et al. |
| 2016/0018125 A1 | 1/2016 | Hamstra et al. |
| 2016/0195288 A1 | 7/2016 | Hamstra |

FOREIGN PATENT DOCUMENTS

| | | |
|---|---|---|
| CN | 201066246 Y | 5/2008 |
| DE | 102008039105 A1 | 2/2010 |
| JP | S60-251336 A | 12/1985 |
| JP | 2000-212733 A | 8/2000 |
| JP | 2003-130494 A | 5/2003 |
| JP | 2003-214722 A | 7/2003 |
| JP | 2006-234376 A | 9/2006 |
| JP | 200890514 A | 4/2008 |
| JP | 2009-250454 A | 10/2009 |
| JP | 4948079 B2 | 6/2012 |
| WO | WO2009/007684 A1 | 1/2009 |
| WO | WO2009/042581 A1 | 4/2009 |

OTHER PUBLICATIONS

Berke et al.; Application of artificial neural networks to the design optimization of aerospace structural components; NASA Tech. Memo; retrieved for the internet (https://ntrs.nasa.gov/archive/nasa/casi.ntrs.nasa.gov/19930012642.pdf); 12 pgs.; Mar. 1993.

LeCroy et al.; Application of neural networks and stimulation modeling in manufacturing system design; SOUTHCON/96 (Conference); Orlando, FL, USA; pp. 322-326; Jun. 25-27, 1996.

* cited by examiner

User Inputs by Zone

- Desired Temperature
- Humidity
- Predicted/Planned Occupancy
- Equipment Schedule
- Ventilation Zone 1
Zone 2
Zone 3
Zone etc...

FIG. 8

ENERGY CHASSIS AND ENERGY EXCHANGE DEVICE

CROSS REFERENCE TO RELATED APPLICATIONS

This application is a continuation of U.S. patent application Ser. No. 13/101,771, filed May 5, 2011, titled "ENERGY CHASSIS AND ENERGY EXCHANGE DEVICE," now U.S. Pat. No. 9,080,789, which is herein incorporated by reference in its entirety.

U.S. patent application Ser. No. 13/101,771 claims the benefit of U.S. Provisional Patent Application No. 61/331,525, filed May 5, 2010 and titled "ENERGY CHASSIS AND ENERGY EXCHANGE DEVICE."

FIELD

This invention relates to building, heating and cooling systems (HVAC) systems and electrical systems, in particular to systems, methods, and devices used to sense and collect local sources of naturally renewable energy, to store energy and to redistribute energy to efficiently meet building needs by using a fully integrated, factory assembled device.

BACKGROUND

Energy Consumption Costs and Problems

Energy consumption in commercial buildings is a very expensive component of the cost for operating and maintaining a building. For example, commercial buildings have expensive air conditioning and heating needs which over the lifetime of the building often add up to more than double the first cost for construction. Attempts over the years to reduce energy consumption have resulted in adding substantial increases in construction costs which are not recouped over the short term.

The typical commercial building heating and cooling system used in the U.S. today is a Variable Air Volume (VAV) system, typically configured this system cannot utilize sustainable energy sources. Buildings represent 40% of the energy used in the U.S. and are fueled almost entirely with fossil fuels that are expensive and damaging to the environment. There are a number of problems that make these HVAC systems energy inefficient, unhealthy, uncomfortable, and that create barriers to adopting new technologies. These problems include:

- Pressure on construction costs encourages owners to keep up front costs low by purchasing inexpensive, wasteful HVAC systems
- Wasting excess energy rejected through chillers, etc. rather than moving it to where it is needed or storing it for later use
- High energy movement through walls because of inadequate insulation—in conventional systems the shell is not part of the solution, but in the invention it can be made to be an energy storage device
- Constantly reheating and re-cooling the building mass rather than holding it at temperature
- Overbuilt, inefficient systems that could be made much smaller
- The inability to use local energy (e.g. solar, body heat, etc.)
- Heating the building when the heating system is least efficient and likewise cooling the building when the cooling system is least efficient—with energy storage, this can be reversed to increase efficiency
- Geothermal systems are typically more costly to build and their function is not designed to maximize efficiency which in turn reduces the use of these systems The rapidly changing alternative energy technologies that are being developed are created in silos to perform the functions of that technology and do not work together without custom integration. These often prove to be unreliable or fail. Few engineering firms have the resources to research and integrate innovative solutions and as a result do not commonly design them into client buildings. This is the way that air conditioning units were built before Carrier standardized the A/C unit which is described in U.S. Pat. No. 2,154,263 in which Willis Carrier patented a standard refrigeration unit for a rail car. The custom-build process is very expensive and limits market use while the standardized product brings down costs and expands the market.

While we are aware that there is a great deal of energy available locally (e.g. body heat, lighting heat, computer heat, solar thermal, solar photovoltaic, geothermal, etc.) the U.S. has failed to adopt a significant use of local energy harvesting (i.e. alternative or renewable energy). According to the U.S. Department of Energy, in September of 2009, alternative energy accounted for less than 1% of the energy used in the U.S. In order to use local energy harvesting the building must have a system capable of sensing the availability of different types of energy and of transporting that energy to where it is needed.

To make that device cost effective, it must be manufactured inexpensively enough to be affordable at a comparative cost to a conventional HVAC system. Further, in order to make alternative energy equipment affordable it must have a longer range of operation (i.e. use energy storage) than that of the intermittent energy sources it attempts to use (e.g. the sun sets, people leave a building, lights are turned off, etc.). That intermittent availability can be extended by storing the thermal energy and this in turn increases the return on investment made in the energy harvesting equipment.

Therefore, designing the energy sensing, harvesting, storage, transportation and controls as a single system capable of connecting a multitude of sources to a multitude of uses enables the efficient application of alternative energy and increases the return on investment in the required equipment in order to make it affordable at the current market cost threshold for HVAC equipment.

Geothermal Heat Pump/Heat Exchanger Costs and Problems

Typical geothermal heat pump heat exchangers come in various configurations including vertical closed loop, horizontal closed loop, "Slinky" loop, pond loop, thermal piles, etc. but generally when applied to a system these configurations have the following characteristics:

1. A single fluid circuit is applied (e.g. a vertical loop is not combined with a horizontal loop).
2. The fluid in the single fluid circuit is mixed and delivered to all heating/cooling devices at a constant temperature. This is the case with U.S. Pat. Nos. 7,571,762 and 7,407,003 issued to Ross, where both devices manifold all the geothermal bores together mixing the fluids. This mixing of temperature dilutes its ability to transfer heat as a result of a reduction of the temperature difference between the fluid and the terminal heat transfer device. The greater the temperature difference, the greater the heat transfer and conversely less temperature difference means less heat transfer.

Current geothermal heat exchanger design is not optimized to provide cooler water to support sensible cooling devices such as radiant cooling panels and chilled beams. Instead, they mix higher and lower temperature water together which reduces the ability to provide sensible cooling with these devices. Additionally, current geothermal heat exchanger design is not configured to maximize the ability to store energy for later use by mixing/combining various heat exchanger configurations.

Previous art includes combinations made of multiple types of alternative HVAC equipment such as Nishman U.S. Pat. No. 4,375,806 which combines a geothermal system with a solar hot water panel and a system of sensors, circuits, and controllers that only uses the solar panel and geothermal system in combination when it is efficient. Nishman's claims were for a system that simply turned two sources on or off based on real time (only) efficiency of the two devices (rather than improving efficiency of the entire system over time). The present invention goes beyond Nishman, with both sources controlled individually to be able to use each source at a variable level to optimize the complete system.

The Ross '762 and '003 patents present a geothermal manifold which allows geothermal loops to be piped in parallel to each other. This method does not allow for loops to be separated for different uses; it combines all inputs and all outputs into a two pipe (one in, one out) system. The invention entailed herein uses automated selection of the best loop(s) to use, and can use loops in different modes simultaneously, can use different types of loops simultaneously, or mix loop fluids as desired for efficiency. Unlike Ross, the present invention has the ability to efficiently heat and cool at the same time. It can achieve this via a heat pump or directly from a dedicated hot thermal energy storage and a dedicated cold thermal energy storage simultaneously.

U.S. Pat. No. 4,360,056 issued to O'Connell on Nov. 23, 1982 teaches a system with multiple geothermal loops which are pumped separately. This system still combines or mixes all the geothermal fluids into a single fluid circuit (piped) system with only one inlet and one output. This does not allow for multiple temperature fluids to be used at the same time, a functionality that improves energy efficiency.

U.S. Pat. No. 5,934,369 issued Dosani on Aug. 10, 1999 describes a method and controller for predicting the charging loads and time for thermal energy storage/thermal slabs. Unlike Dosani, the present invention goes beyond this previous art. This prediction and knowledge of thermal energy storage is useful yet it is only fully utilized when combined with building load predictions, on-peak/off-peak electrical cost rate structure, and controls of sources and sinks as the invention herein covers.

U.S. Pat. No. 5,778,683 issued to Drees on Jul. 14, 1998, titled "Thermal storage system controller and method" teaches a utility rate with a peak rate structure; it does not entail thermal storage for reduction of system size and for increasing the availability of sustainable energy as the present invention does. Drees entails a data structure of the utility rate structure and determines the relative cost-effectiveness of using thermal storage versus non-thermal storage and also how much of the thermal storage capacity can be used. It does not cover the thermal capacity and charge/discharge rate predictions/measurements that Dosani does. As it does not combine these inputs, it cannot reach the most efficient energy use solution. The present invention does have the additional functionality to create the most efficient energy system. The present invention also includes the system design function to increase efficiency savings by predicting the thermal storage performance along with a matrix of other factors which allow the system to be properly sized and not waste first cost capital on an oversized, less efficient HVAC system.

The need exists for solutions to the above problems with the prior art.

SUMMARY OF THE DISCLOSURE

A primary objective of the present invention is to provide systems, methods and devices for a simple to implement, multifunctional, factory produced, self-contained (aside from sources/sinks/storage and piping), fully integrated, automated heating and cooling system that incorporates methods and devices required for a building HVAC system that includes, but is not limited to, automated real time and future energy requirement projections for a building, or group of buildings, to more efficiently meet building energy requirements. This energy management capability uses devices having the automated functionality of energy sensing, load forecasting, harvesting, storage, management and transportation to increase the efficiency of building heating and cooling systems while simplifying the design and construction of the building energy system. This system requires much less custom engineering, less on-site construction time and complexity than currently available alternatives.

A secondary objective of the present invention is to provide systems, methods and devices to adapt computer technology to inventory energy sources that uses sinks and computer technology to control the heat exchanger, refrigerant, sensors, motors, pumps, valves and energy collection devices required to harvest energy from multiple local sources.

A third objective of the present invention is to provide systems, methods and devices to efficiently transport energy from where it is produced where it is needed without introducing a lot of complexity to the construction process. This includes set up screens for the system that allow it to be easily customized to the implementation.

A fourth objective of the present invention is to provide systems, methods and devices for a mechanical-controlled and computer-controlled fluid mix determination and temperature-control systems and interconnectivity functionality including methods and devices for controlling the transportation and exchange of energy. This functionality facilitates the selection, interconnection and switching required for the mixing and use of common and uncommon sources of energy, so as to use that energy more efficiently. Said functionality also facilitates the selection, switching, and interconnection of the common and uncommon devices including solar collectors, geothermal, energy recovery units, fuel cells and other sources of energy required to use said sources and to allow the sources to be mixed to increase the efficiency of the energy harvesting, to use multiple inputs connected to multiple outputs, and to provide significant increase in energy synergy.

A fifth objective of the present invention is to provide fully integrated and automated systems, methods and devices for providing a next generation geothermal heat exchanger that employs the ability to mix different types of loops in a single implementation, to charge some of the loops with thermal energy while others are being simultaneously discharged and to store energy in the loops and that incorporates the intelligence and controls of the system into a standardized product that can be attached to any form of closed loop geothermal heat pump system. This geothermal heat exchanger can be used as an optional addition to the energy chassis device (i.e. the complete central heating, cooling and energy management system that includes the computer, software, refrigerant-based heat transfer device such as a heat pump, circulating pumps and variable speed drives, interconnecting piping, sensors and control devices, plus the electrical connections, inverters, switches, fuses and wiring and the like required to manage and control the electrical and HVAC system), or in a stand-alone configuration to significantly reduce the custom engineering, construction time and construction complexity required to implement a geothermal system with equivalent functionality.

A sixth objective of the present invention is to provide systems, methods and devices for providing a next generation geothermal heat exchanger that uses emerging computer technology, sensor and control technology, advanced heating and cooling concepts, and the ability to package the intelligence and control platform into a standardized product for a combination and integration of technology that increases the performance of the geothermal system while maintaining, or reducing, the installed cost of the system.

A seventh objective of the present invention is to provide systems, methods, and devices for providing a next generation geothermal heat exchanger which can potentially perform building sensible cooling for approximately 60 to approximately 80% of the total cooling load, without the aid of energy consuming compressors and can be used as a component of a total building energy system, or as a standalone device/unit.

An eighth objective of the present invention is to provide systems, methods, and devices for managed and measured short and long-term thermal energy storage in a hybrid configuration (i.e. the combination of multiple types of sources/sinks in the same system), utilizing various forms of geothermal heat exchanger configurations in addition to energy storage within the building fabric (structure) via embedded hydronic piping that can also be combined with other thermal storage such as phase change materials/ice storage, chilled water storage, phase change materials/hot water storage, etc. The invention allows for integration with all thermal energy storage known in the art, as well as any future energy storage. The use of thermal energy storage time shifts energy harvested from the environment, so it can be used when the original source is not available (e.g. the sun is down, waste heat is not being produced, people have left the building, and the like). This allows multiple sources of energy to be merged so that when one source is insufficient, or too expensive to implement to meet the full load requirement, multiple sources can be used to reduce the amount of capital required to build the entire system that makes each source available in a reservoir, so that it may be reliably used according to projected system needs and optimization calculations.

A first embodiment of the present invention provides a method for determining an optimal use of plural different thermal energy sources and sinks including storage in a heating and cooling system. The steps include determining a thermal energy stored in one or more of the thermal sources available to be extracted or utilized by the system; determining a thermal energy capacity of one or more thermal sinks available to be utilized by the system; determining a thermal energy storage and dissipation rate for the one or more thermal source, sinks and storage; analyzing a thermal storage capacity for a preselected time period; predicting a thermal energy loss and gain and a thermal retention over a storage period; comparing available thermal sources to a target parameter; selecting at least one of the thermal sources and sinks; and initiating a use of the selected at least one thermal source and sink.

A second embodiment provides a geothermal heat exchanger system that includes multiple different independent geothermal fluid sources and sinks and multiple geothermal heat exchanger fluid circuits which are circulated or grouped independently to allow the multiple different geothermal fluid sources and sinks to be used simultaneously as independent sources and sinks for use as a hot, cold or other temperature fluid source or sink. One or more of the independent geothermal fluid sources can be dedicated for use as thermal storage and the thermal storage is designed to store energy for a predetermined time period. One or more of the multiple independent geothermal fluid sources can be configured to optimize performance as a hot or cold loop and a flow of fluid for each of the multiple independent geothermal fluid sources are independently connected to be controlled by a computer controller for use and mixing. In an embodiment, a geothermal heat exchanger is connected with one or more of the selected multiple independent geothermal fluid sources for a preselected use.

A third embodiment of the invention provides prefabricated central energy plant for the process and transportation of air conditioning, heating, ventilation, electricity, or any combination thereof in a building, community, or campus. The energy plant includes plural connections for multiple sources and sinks of thermal fluid and electrical energy, multiple independent fluid lines each having an independent fluid temperature, a computer controlled valve and pump connected with at least one of the multiple independent fluid lines for controlling fluid movement and mixing, and at least one computer integrated sensor for sensing at least one of a temperature, flow rate, energy transfer rate and total energy transfer. The energy plant can also include one or more of at least one of hybrid fluid sinks and a hybrid fluid sources dedicated to one or more of a hot fluid, a cold fluid and a preselected temperature fluid for thermal storage for a predetermined storage duration. The energy plant can also include a heat pump connected to at least one of the multiple fluid sources and sinks, a control valve connected between the heat pump and at least one of the multiple fluid sources and sinks, a sensor connected between the heat pump and at least one of the multiple fluid sources and sinks, and a pump connected to pump a fluid from at least one of the multiple fluid sources and sinks to the heat pump and can include a two-ended distribution header having separate supply and return line that directs a warm fluid to one end and a cool fluid cooler than the warm fluid to the other end of the two-ended distribution header.

The energy plant can also include one or more of a fabricated skid or modular transportable unit wherein the prefabricated central energy plant is scalable and the prefabricated central energy plant can be expandable by adding at least one of a second modular transportable unit, a domestic hot water source, additional heating units, additional chilling units, additional thermal energy storage units, additional sensors, additional pumps, additional valves, and the like.

In regard to the computer system, the energy plant can include one or more of an algorithm for metering and billing of a heating and cooling supply based on usage, an artificial intelligence software executed by a computer to controllably mix and move fluid to and from one or more of the multiple fluid sources and sinks and to and from one or more of the multiple electrical sources; an integration software for configuration and set up and a software and internet or LAN connection to track and share performance data with the designer and building operator.

Further objects and advantages of this invention will be apparent from the following detailed description of preferred embodiments which are illustrated schematically in the accompanying drawings.

BRIEF DESCRIPTION OF THE DRAWINGS

FIG. 8 shows a variety of user inputs and set points by zones.

DETAILED DESCRIPTION

Figure 1:
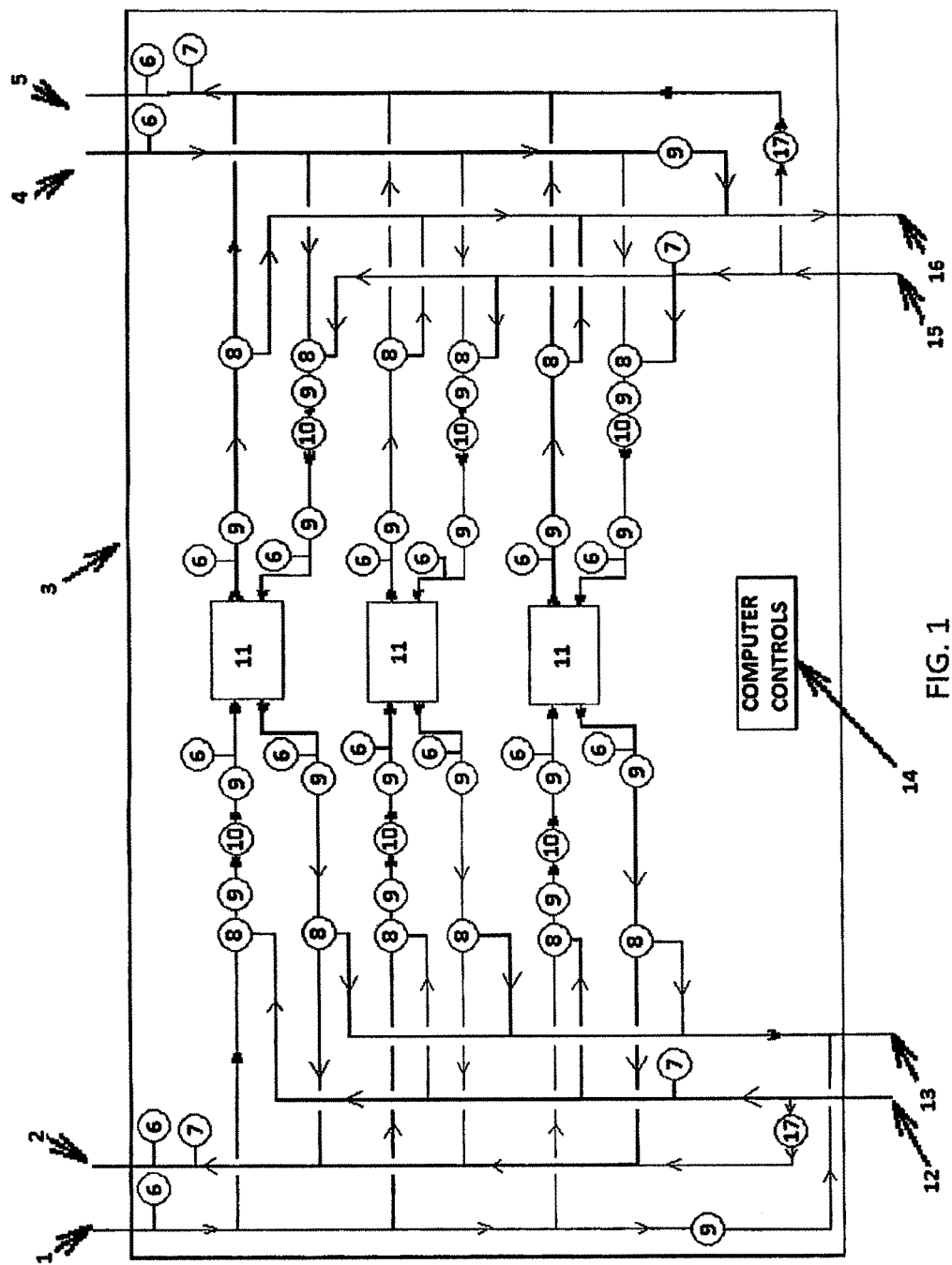
FIG. 1 shows a schematic of the energy chassis system with a computer for controlling heating and cooling operations in a commercial building.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the description and the drawings to identify components:

1 hot fluid return
2 hot fluid source
3 energy chassis
4 cold fluid return
5 cold fluid source
6 temp. indicator and sensor
7 flow meter
8 three-way control valve
9 isolation valve
10 variable volume circulation pump
11 fluid-to-fluid refrigeration-based heat pump
12 supply from "warm" side of energy exchange device
13 return connection to "warm" side of energy exchange device
14 computer-based control system
15 supply connection from "cool" side of energy exchange device
16 return connection to "cool" side of energy exchange device
17 variable volume circulation pump
20 geothermal earth heat exchanger return
21 geothermal earth heat exchanger supply
22 Vertical closed loop geothermal heat exchange
27 exchanger computer
23 horizontal, "Slinky" closed loop geothermal heat exchanger
29 heat exchanger
31 energy sys management computer
32 real-time load/demand
33 historical tracking of loads
34 user inputs to load predictions
35 internet/LAN interface
36 building and system sensors
37 building and systems controls
38 database, history, real-time and predicted
39 database, system updates
41 energy exchange unit
42 contoller
43 fluid control valves
44 fluid mixer
46 thermal storage unit The following is a list of definitions for terminology is used throughout the detailed description and appended claims.

Coolth: The noun form of "cool"; opposite of warmth.

Energy Demand: User driven requirements to change building set points for temperature, humidity, air quality, and electricity.

Energy Sink aka Sink: An environment capable of absorbing energy from an object with which it is in thermal contact. A sink can be used for depositing, or dissipating heat. A sink can under certain conditions become a reservoir for the storage of heat or coolth energy that can then be extracted for use upon demand.

Break even date: number of years until apparatus is paid off, via energy savings, tax incentives, and the like Coolth energy is sometimes used as a linguistic convenience to describe cooling as a form of energy like heat (this is common usage, but not technically correct because cool is the absence of thermal energy).

Energy Chassis Device: The complete central heating, cooling and energy management system that includes the computer, software, refrigerant-based heat transfer device such as a heat pump, circulating pumps and variable speed drives, interconnecting piping, sensors and control devices, plus the electrical connections, inverters, switches, fuses and wiring and the like required to manage and control the electrical and HVAC system.

Energy Exchange Device: The system that manages the sensing, independent routing, selecting of energy sources and uses including the computer, software, circulating pumps and variable speed drives, interconnecting piping, electrical connections, inverters, switches, fuses, wiring, sensors and control devices and the like to manage and operate the system.

Energy Source: A device, or material from which energy can be extracted. That energy can be of any type including coolth, heat energy, or electrical.

Equipment Specifications: response time, BTUor/TON capability, differential accuracy, efficiency, controllability, flow rate, energy flow rate, power usage, residual generation, cooling mechanisms and effectiveness and the like.

Hybrid sources/sinks: The combination of multiple types of sources/sinks in the same system, e.g. a vertical bore geothermal field in the same system as a slinky loop horizontal geothermal bore filed, or a cooling tower combined with a solar thermal panel combined with a closed loop vertical bore field, and the like.

HVAC: Heating, ventilation, and air-conditioning.

Internet/LAN: Access to the internet that can be wired or wireless.

Independent connections: Fluids from each source or to each sink in the system can be used independently, or mixed but are not required to be mixed as current art does.

Load: Work (i.e. heating, cooling, lighting, the operation of plug in devices) that is to be done. Building load refers to the amount of energy required for the building to maintain temperature, humidity, air quality, or the energy required to meet electrical device (i.e. "plug load") demands.

Modular: Can be scaled up or down in size by adding or replacing units, combined with others, and can be transported.

Operating cost: energy cost, maintenance cost, part replacement cost, service cost, and the like.

Optimized: Optimal based on one or more optimization characteristics.

Optimization target parameters include: initial cost, operating cost, lifecycle cost, break even date, energy usage, environmental impact, thermal comfort, indoor air quality and the like.

Optimal system performance: when user weighted parameters are determined and the energy system is subsequently, successfully operated to those parameters with the least margin of standard error.

Optimal selection: matching user weighted parameters with the least margin of standard error.

Performance characteristics: Energy capacity, energy decay and gain, energy dissipation rate, efficiency, environmental impact and the like for each of the different energy types. Prefabricated: Manufactured in an offsite facility as a pre integrated, transportable, installable, unit.

System data: Equipment identification and specification, piping specifications, radiant specifications, duct specifications, and the like.

Thermal storage: A material, device, substance for the use of storing heat or coolth energy, e.g. geothermal, phase change, building fabric, and the like.

User inputs: include desired temperature, desired humidity, predicted or planned occupancy, equipment operation schedule, ventilation and the like, for one or more heating and cooling zone.

The present invention relates to systems, methods, and devices used to sense and collect local sources of naturally renewable energy, to store energy and to redistribute energy to efficiently meet building needs by using a fully integrated, factory assembled device. This device uses equipment that harvests or converts energy, stores energy and moves that energy to locations requiring energy. The device can also include optional equipment including a next generation geothermal heat exchanger that achieves higher energy harvesting efficiency and provides greater functionality than current geothermal exchangers.

While the invention is described for heating and cooling of an interior space, the energy chassis device can be used to provide electrical power. For example, the energy chassis device can be connected with a variety of electrical sources such as an electrical grid, a solar photovoltaic electricity generator, a wind powered electricity generator and the like. In this example, the software would track and predict electrical usage and the cost of providing electrical from each of the sources, then determine which electrical source to use to best meet the various electrical loads.

FIG. 1 is a schematic diagram of a preferred embodiment of the energy chassis system with a computer controller for controlling heating and cooling operations in a commercial building. As shown, the energy chassis device enclosure 3 includes a hot fluid return 1 connection from the heating loads, a hot fluid supply 2 connection to the heating loads, a cold fluid return 4 from the loads and a cold fluid supply 5 to the cooling loads with a temperature sensor and indicator 6 for monitoring the temperature of the hot and cold inputs and outputs and produce a corresponding temperature signal that is fed into the computer controller 14. The energy chassis device enclosure also includes a supply connection 12 from "warm" side of energy exchange device and a return connection 13 to "warm" side of energy exchange device. Similarly, the cold side includes a supply connection 15 from "cold" side of energy exchange device and a return connection 16 to "warm" side of energy exchange device.

Each of the hot fluid supply 2 and the cold fluid supply 5 lines also include a flow meter 7 to monitor the flow of fluid out of the energy chassis device and a variable volume circulation pump 17 to provide hot or cold fluid directly to the loads without refrigeration system operation and allows the computer controller 14 to monitor and control the fluid into and out of the energy chassis device enclosure 3. Each hot fluid return 1 and cold fluid return 4 includes an isolation valve 8, 11. A three-way control valve 8 is provided for selectively controlling fluid into and out of each individual fluid-to-fluid refrigeration-based heat pump 11. The system can be configured to have a different quantity and size of the heat pumps 11 depending on the building that is being heated and cooled. The fluid line between the three-way control valves 8 and the heat pump 11 includes temperature sensors 6, isolation valves 9 and a variable volume circulation pump 10 in the input line between isolation valves 9 on each of the hot and the cold sides of the heat pump 11.

Figure 2:
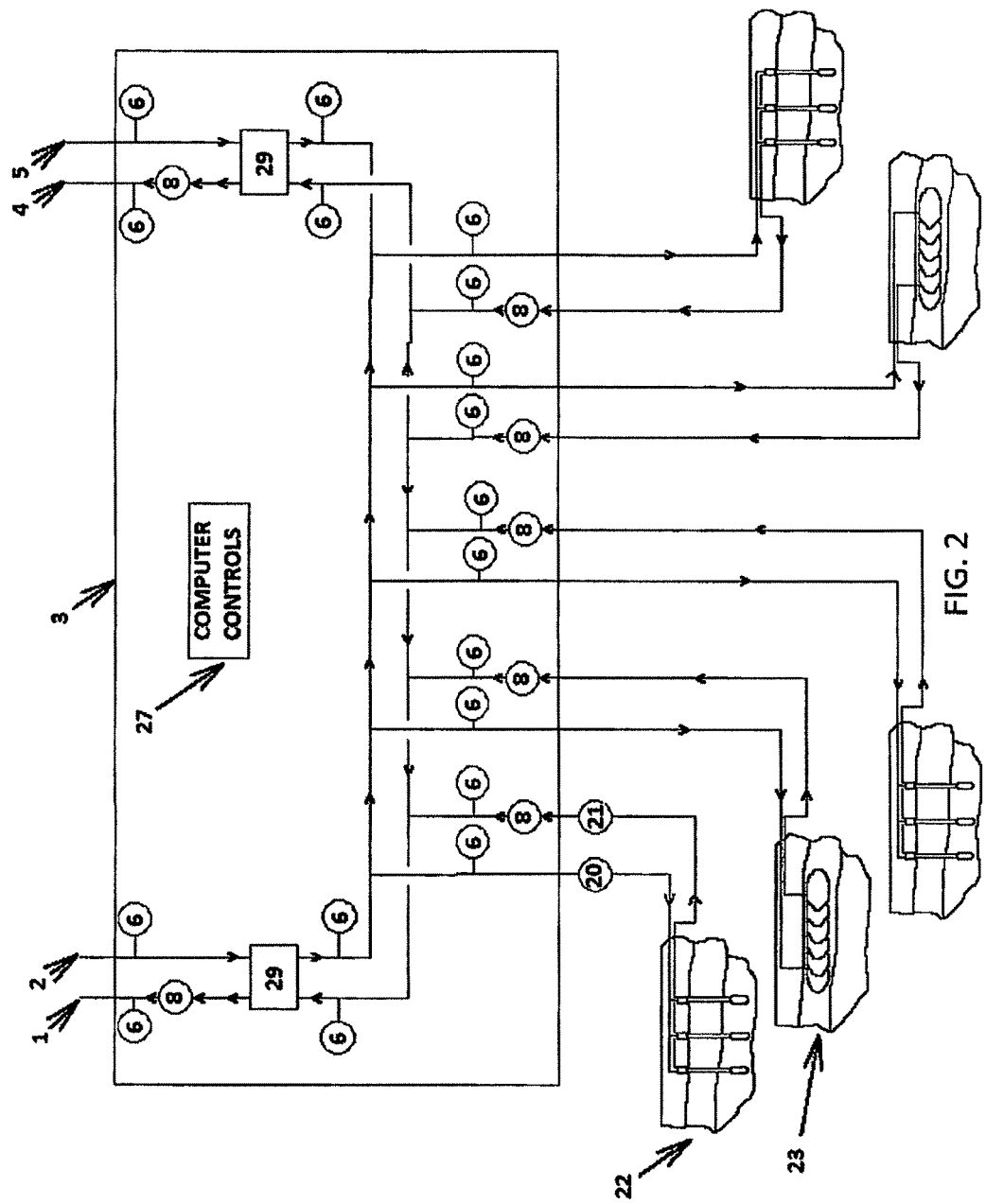
FIG. 2 shows a schematic of the energy exchange unit with computer (i.e. the system that manages the sensing, independent routing, selecting of energy sources and uses including the computer, software, circulating pumps and variable speed drives, interconnecting piping, electrical connections, inverters, switches, fuses, wiring, sensors and control devices and the like, to manage and operate the system) for a commercial building according to a preferred embodiment of the present invention.

FIG. 2 shows a schematic of the energy exchange unit system with a computer controller 27 for a commercial building. The energy exchange unit is the system component of the energy chassis device. The embodiment shown in FIG. 2 illustrates the energy exchange connected to geothermal loops. This is one possible configuration and should not be used to limit the scope of the invention as claimed.

The hot and cold input 2, 5 and output lines 1, 4 of the geothermal energy exchange unit shown in FIG. 2 are similar to the configuration shown in FIG. 1 including temperature sensors 6 and variable circulation pumps 8 to and from the heat exchanger 29 and between the heat exchanger 29 and the vertical closed loop geothermal heat exchanger 32 and horizontal, "Slinky" closed loop geothermal heat exchanger 33.

The energy exchange device is a standalone component of the energy chassis device that provides energy transfer, switching, and mixing capability to allow multiple sources of energy to be utilized simultaneously. In a preferred embodiment, the energy chassis device includes the energy exchange device as well as the heat pumps, pumps, valves piping and the like normal to a heat pump heating and cooling system. In order to improve the synergy of the system, the energy exchange determines and utilizes the most cost-effective real time and predictive combination of sources required to meet the load demand. The energy exchange then mixes and delivers the energy from the selected sources for use, possibly by multiple devices. This energy exchange device can be used to both acquire needed energy, or to manage the storage of excess energy.

The co-inventors' studies of buildings being built today to ASHRAE 90.1-2007 Standard show that with the use of the energy chassis device according to the present invention, as the central component of a total building, can reduce building energy consumption by approximately 35 to approximately 50% with little, or no increase in construction cost. To achieve this level of energy savings requires that the energy chassis be a standardized product in lieu of the traditional approach which attempts to create a unique, one-of-a-kind field-constructed system within each construction project.

There is a precedent for this strategy. A similar approach to creating a standardized product that embodied the technical solution for air conditioning and reduced the complexity of designing and installing air conditioning is credited to Mr. Willis Carrier who founded Carrier Corp. the largest manufacturer of air conditioning equipment. His efforts to make standardized air conditioners that could be mass marketed are generally seen as making air conditioning both reliable and affordable. This was achieved in part because he eliminated the need for a custom design and on-site assembly increased reliability. With this strategy he succeeded in building the Carrier Corporation. The energy chassis device of the present invention is designed to be manufactured in a process that includes techniques to reduce manufacturing costs and increase quality as compared to solutions that are integrated solely on the construction site.

The energy chassis device consists of several primary components which may include refrigerant-based fluid-to-fluid heat pumps or chillers connected to an energy transportation system composed of PEX tubing embedded in concrete, or similar water transport devices and/or hollow core concrete that can use forced air to transport energy designed to be compatible with radiant heating and cooling and thermal storage. Plural different energy harvesting devices can be used, some existing and some not yet perfected or imagined, with software models that predict the performance of the plural different devices under a range of circumstances and provide the data required to optimize the entire system.

Figure 3:
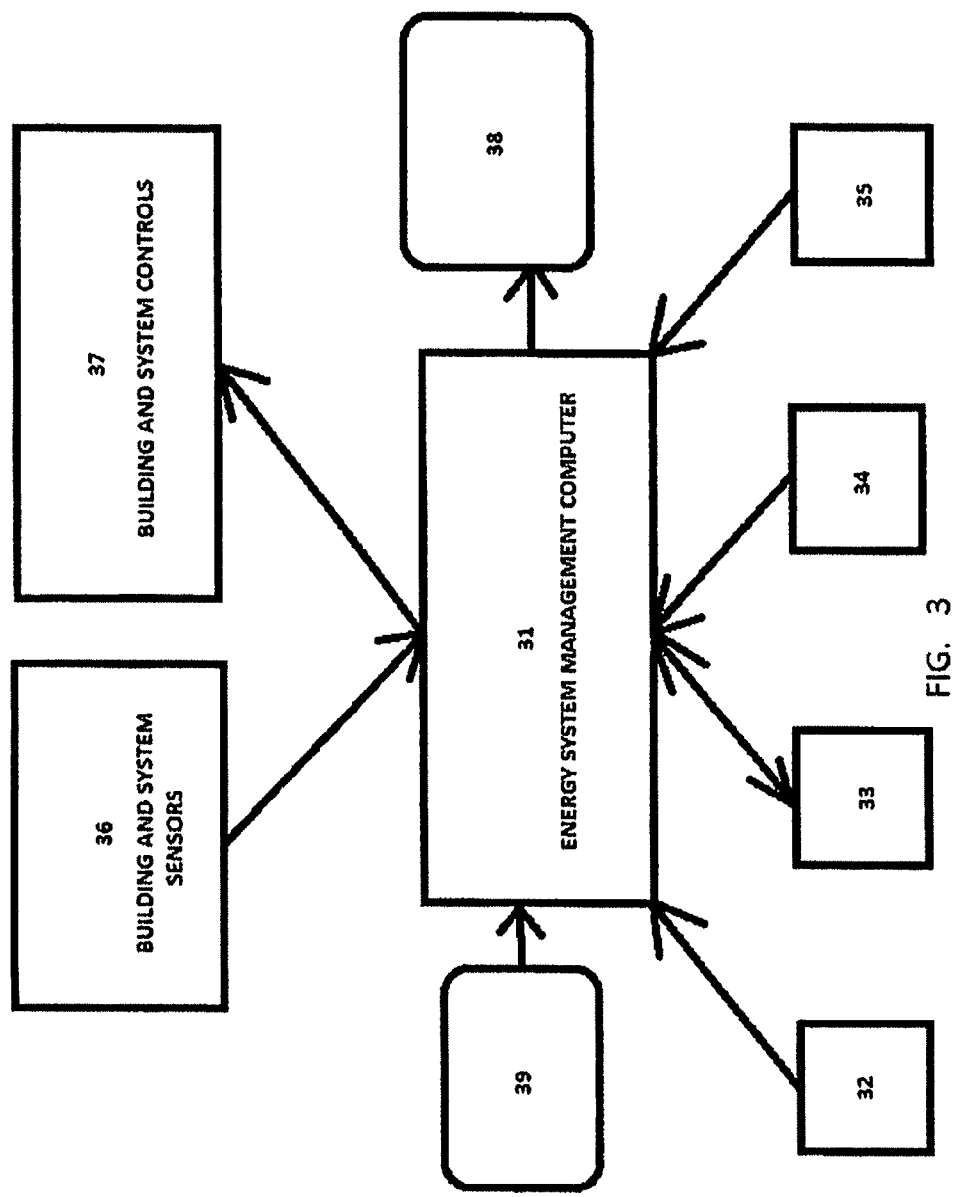
FIG. 3 is a schematic block diagram of the energy system management computer interfaces and databases according to a preferred embodiment of the present invention.

FIG. 3 is schematic block diagram of the energy system management computer interfaces and databases according to a preferred embodiment of the present invention. As shown, the energy system management computer is interfaced with real time load/demand data 32, historical load tracking data 33, user inputs for a user to input load predictions 34 (FIG. 8) for each zone, a data base 38 for storing history, real time, and predictive data, failure or alarm notice output to system, installer, user, and/or owner and a memory to store data related to system updates, patches, add on packages 39. The energy system management computer also includes an interface with the building sensors 36 and controls 37 and an Internet/LAN interface for receiving real-time information such as weather forecast, and electrical rate structure 35.

The energy chassis device computer controller includes data bases with parametric optimization models that can be executed to determine the components, component characteristics, and size that will optimize for user determined parameters for the system design. This step reduces the custom engineering required to configure the system properly for different buildings and environmental situations. The energy chassis device also includes plate and frame heat exchangers or similar for direct heat transfer without using a refrigeration system, circulating pumps with variable frequency drives, control valves and sensors as shown in FIG. 1.

Figure 4:
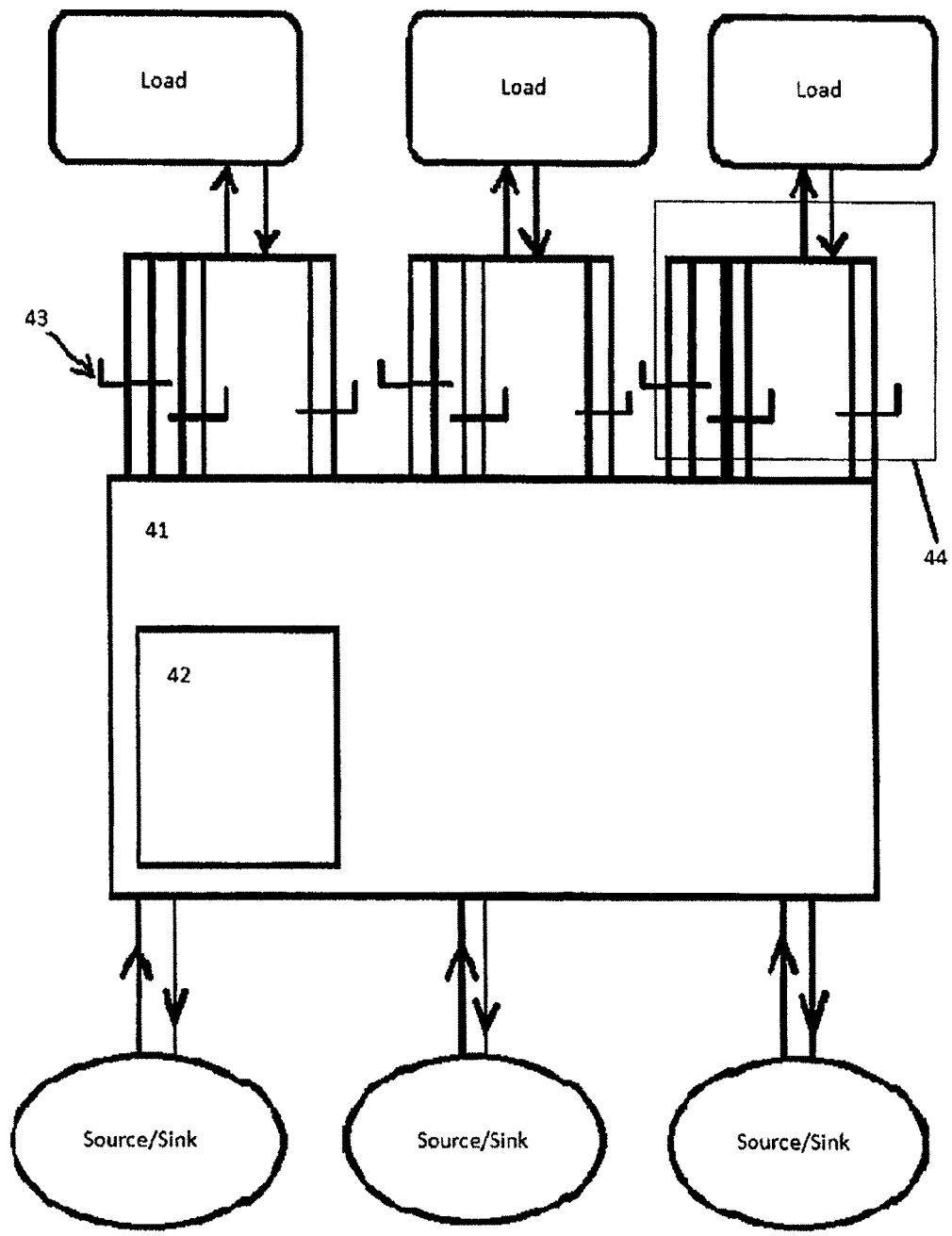
FIG. 4 is a block diagram of an intelligent independent fluid selection showing the energy exchange unit interfaced with sources/sinks and system loads.

FIG. 4 is a block diagram of an intelligent independent fluid selection system showing energy exchange unit 41 with a computer-based controller 42 interfaced with sources and sinks A, B and C, with fluid mixers 44 and flow control valves 43 to one or more loads X, Y and Z, three in the example shown.

Figure 5:
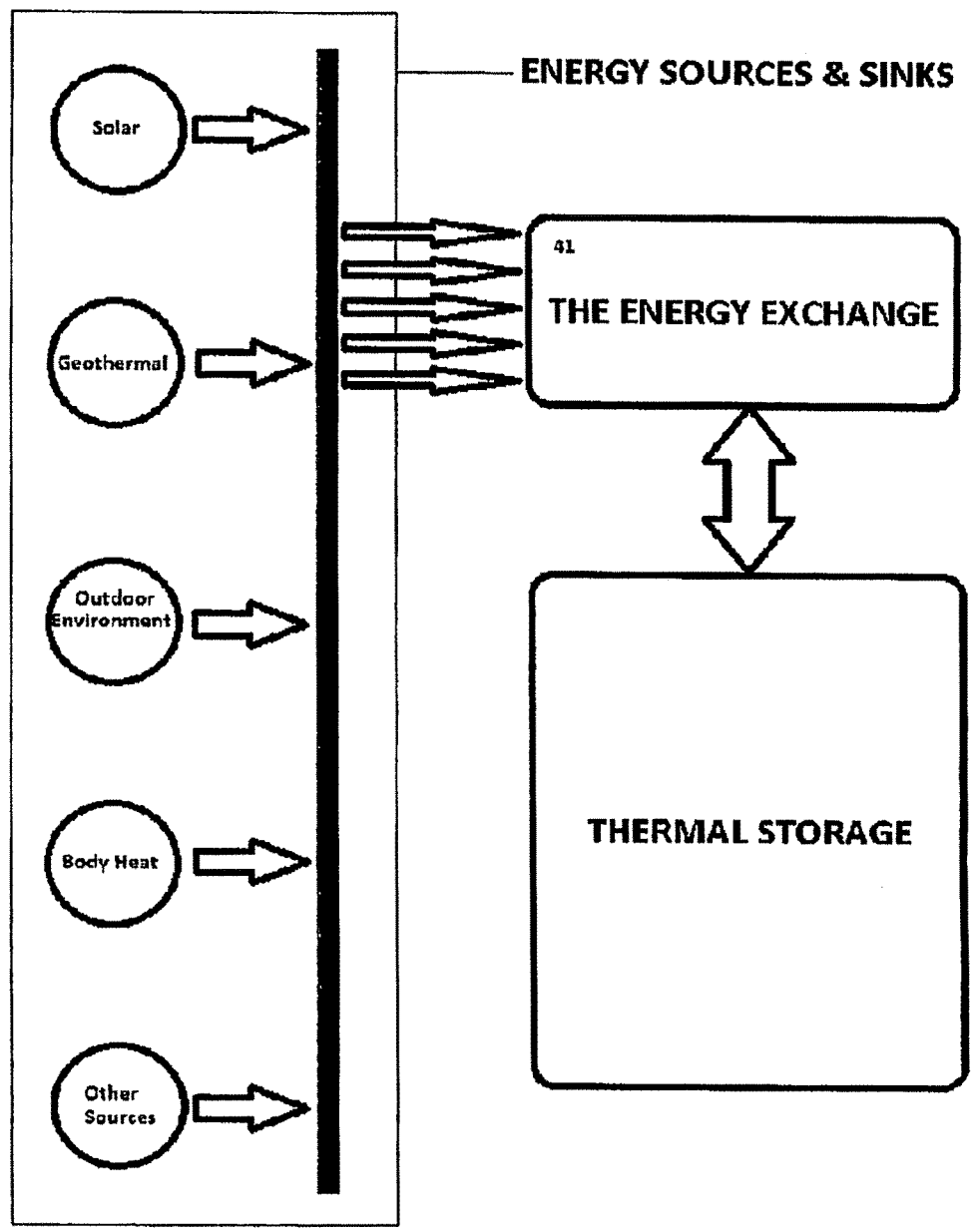
FIG. 5 is a block diagram of hybrid energy harvesting and thermal storage management according to the present invention.

FIG. 5 is a block diagram showing hybrid energy harvesting from different sources such as, but not limited to, solar A, geothermal B, the outdoor environment C, body heat D and other sources E to the energy exchange unit 41 shown in FIG. 4 to and from the thermal storage unit 46.

Referring to FIG. 1 in conjunction with FIG. 2, each of the heat pumps 11 is piped to access the following fluid streams via various control value sequences, the hot fluid supply/return 1 and 2, chilled fluid supply/return 4 and 5, warm geothermal fluid supply/return 12 and 13 and cool geothermal fluid supply/return 15 and 16. Additional custom temperature fluids are optional. The energy chassis device includes computer controller to selectively position control valves 8, 9 and control the speed of the circulating pumps 10 to allow each heat pump module 11 to operate independently to move heat from any fluid to any other fluid.

When fluid temperatures are in the range required for cooling the building space, the device can use a plate and frame heat exchanger to provide chilled fluid from the cool geothermal fluid 15 and 16 by operating the circulating pumps 10 only and not operating the refrigeration system thereby significantly reducing energy consumption and increasing energy efficiency. Additionally the system can manage the various thermal energy storage devices to add heat to, or subtract heat from the various fluid paths.

The computer-based control system determines on a real-time basis the current heating and cooling current energy need and the projected energy need. In real time, using the internet, the system includes current electricity rate structures and on-peak/off-peak rate structures as well as voluntary electrical load shedding or rescheduling. Predictions for the projected energy needs are based partly upon one, or more of weather forecasts provided via internet connection and accumulated building/weather performance response history. The energy chassis system includes artificial intelligence software that uses the weather data and the building performance response history to optimize the use of energy based on one or more of the present and predicted cost of the energy and the environmental impact. Then, based upon these loads and the temperatures of the various fluid streams, the control system determines which individual fluid stream or combination of fluid streams to extract heat from or deposit heat into, to optimize energy cost.

Figure 9:
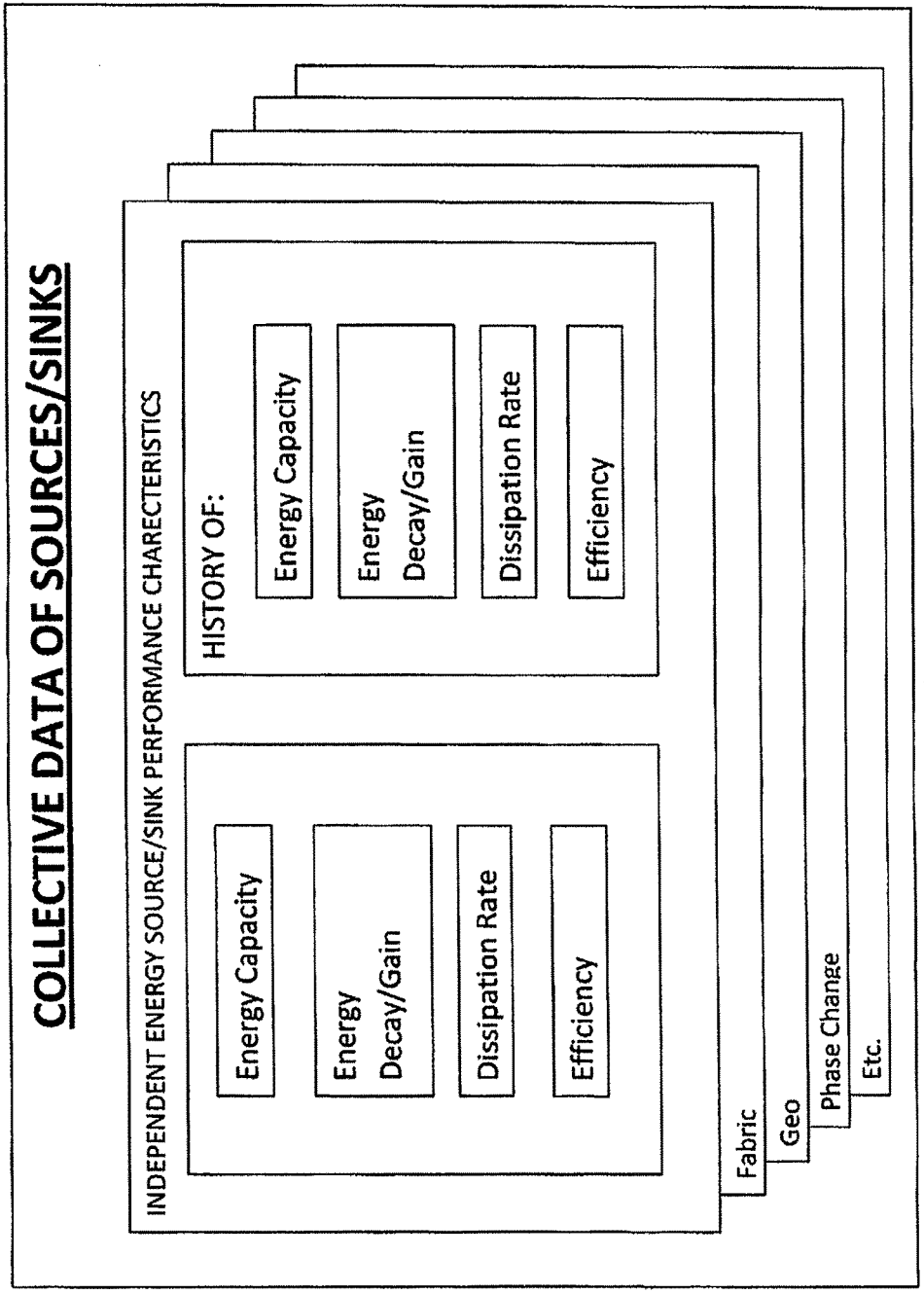
FIG. 9 shows a variety of collective data for different types of sources and sinks.

The controller also maintains communication with the next generation geothermal heat exchanger (described below) to optimize its operation with consideration for current and projected energy needs and fluid temperatures. The control system also logs all operating parameters to allow for system tuning and optimization as well as providing information related to equipment failure for trouble shooting and logs operating parameters to allow for system tuning and optimization as well as providing information related to equipment failure for trouble shooting. FIG. 9 shows a variety of collective data for different types of sources and sinks such as fabric, geothermal, phase change, etc.

Figure 6:
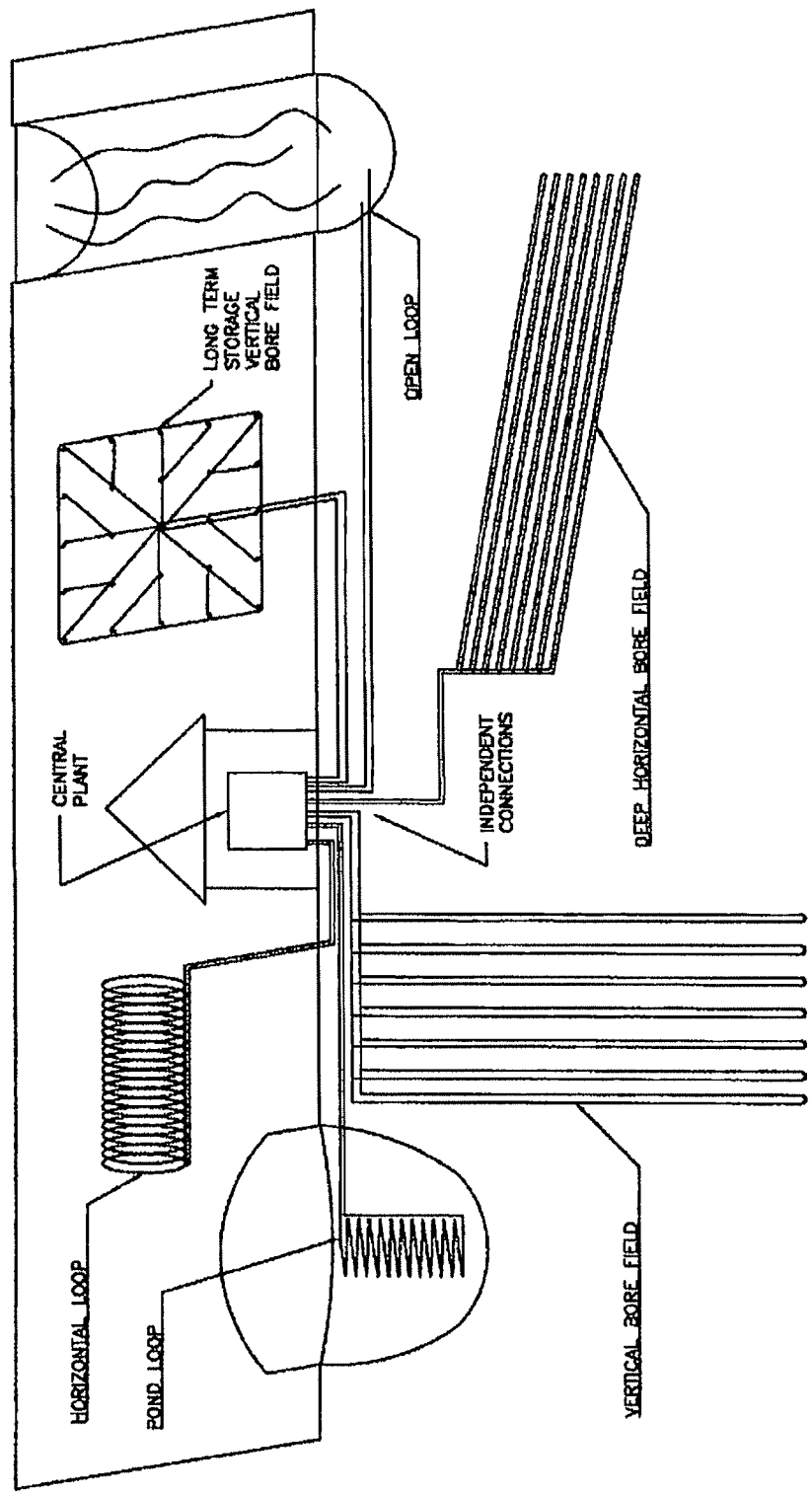
FIG. 6 is a schematic diagram showing multiple different independent geothermal loops.

FIG. 6 is a schematic diagram showing multiple different independent geothermal loops connected to a central plant. This heat exchanger takes advantage of installing the intelligence and controls of the system into a standardized product that can be attached to any form of closed loop geothermal heat pump system. It uses emerging computer, sensor, and control technology, advanced heating and cooling concepts, and the ability to package the intelligence and control platform into a standardized product to increase the performance of the geothermal system while maintaining, or reducing the cost of the system. Building sensible cooling often equal to approximately 60 to approximately 80% of the total cooling load, can potentially be performed without the aid of energy consuming compressors. The heat exchanger can be used as a component of a total building energy system, or stand alone.

A typical geothermal, heat pump, heat exchanger system comes in various monolithic fluid circuit configurations using only one of these: vertical closed loop, horizontal closed loop, "slinky" loop, pond loop, etc. but generally when applied to a system they will have the following characteristics. First, a single fluid circuit configuration is applied. For example, a vertical loop is not typically combined with a horizontal loop. Second, the fluid in the single fluid circuit is generally mixed and delivered to all heating/cooling devices at one temperature. This mixing of temperature dilutes the ability to transfer heat through a reduction of the temperature difference between the fluid and the terminal heat transfer device. The greater the temperature difference, the greater the heat transfer and conversely less temperature difference means less heat transfer.

Figure 7:
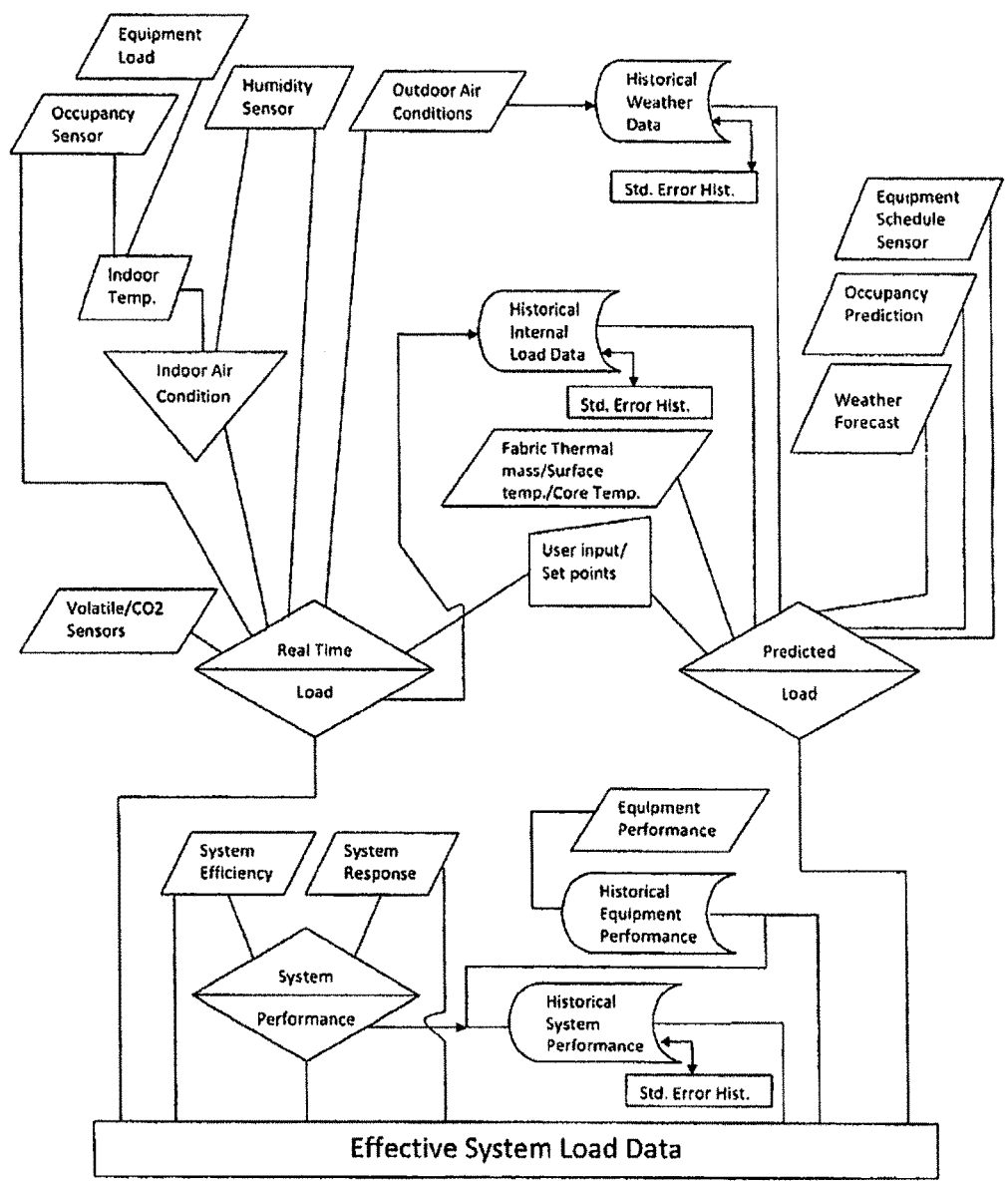
FIG. 7 is a block diagram showing the system load data according to an embodiment of the present invention.

The method, systems and devices of the present invention addresses the efficiency-reducing characteristics of the said typical geothermal system by incorporating multiple independently-circuited geothermal heat exchangers, multiple independent variable speed circulating pumps, control valves to direct the fluid flow to either a "warm" or "cool" geothermal fluid header (optional as the flows can remain independent), and sensors to measure fluid temperatures and heat flow based on temperature difference and mass flow rate, or from a simple btu meter in each loop and in the warm and cool geothermal fluid headers. Computer-based controls include the software designed to optimize and manage the flows and temperatures. FIG. 7 is a block diagram showing an example of an efficient system load data according to a preferred embodiment of the present invention including real-time loads, predicted load data as well as present and historical system performance data.

As shown in FIG. 7, the system determines the real time load and the predicted load and uses the load data in combination with the system performance data and historical system performance data to determine the effective system load. The system uses information such as equipment load, occupancy, humidity external environment conditions along with user inputs and the like to determine the real time load. Information used to determine the predicted load includes information such as historical weather data, historical internal loads, occupancy predictions, weather forecast, the fabric thermal mass, surface temperature and core temperature and the like as well as user inputs and set points. Examples of user inputs are shown in FIG. 8 as desired temperature, humidity, predicted and or planned occupancy of the space, equipment schedule, ventilation and the like. The user input can be by zone, for example an auditorium may be expected to have full occupancy at the same time the office space is not occupied. In this example the two zones with different predicted occupancy will have different energy requirements.

The independent geothermal heat exchangers, in the configuration shown in FIG. 2, are arranged on a two-ended distribution header with separate supply and return piping that directs "warmer" geothermal fluid to one end and "cooler" geothermal fluid to the opposite end. This configuration allows unique operational characteristics including not mixing hot to cold geothermal fluid so that the temperature is not diluted and retains an ability to transfer heat because of the greater temperature differences. Second, sensible cooling devices such as active and passive chilled beams and radiant cooling panels can be supplied with much cooler water (typically 55 to 60° F.) for most, if not all, of the cooling season by only operating a circulating pump and not engaging refrigerant-based heat pumps. This is possible with the configuration shown in FIG. 2 because the novel circuiting and controls prevents the "cooler" independent geothermal heat exchangers from being thermally contaminated with relatively high temperature rejected heat from refrigerant-based heat rejection devices.

The rejected heat from refrigerant-based heat rejection devices is circuited to the "warmer" independent geothermal heat exchangers where their heat is dissipated. The "warmer" geothermal heat exchangers become more efficient in heat recovery, in heating mode, due to the higher temperature difference between the fluid and the surrounding earth. The heat stored in the warmer heat exchangers is available as a first source for heat extraction systems that might be heating domestic hot water, etc. If the building heating load, the extraction of heat from the earth and moving it to heat the building or its systems, is greater than the heat available in only the "warm" geothermal heat exchangers, or if it is more efficient to do this, the "cooler" geothermal heat exchangers are diverted to become a heat source instead of a heat sink and thereby they will be "recharged" to a lower temperature to provide sensible cooling.

If the annual heating/cooling demands are heating dominated, and additional heat sources are available such as solar thermal collection, one or more of the "warmer" geothermal heat exchangers can be designated as the "hottest" and it will receive any solar-generated heat that is not used immediately. This heat raises the temperature of the soil surrounding this geothermal heat exchanger and a portion of this heat will remain available for future use. This allows the system to take advantage of natural seasonal temperature swings to capture and store heat, or cool when it is available for use later in the year when it is needed. This long term thermal storage increases the availability of harvested energy for future use, resulting in increased efficiency as well as providing a mechanism to manage the total energy available in the exchangers thereby reducing the potential that the energy in the exchangers will become depleted and run short of energy.

The configuration shown in FIG. 6 allows for an optimum mix of the various geothermal heat exchanger configurations (vertical, horizontal, pond loop, thermal piles, etc.) to be used simultaneously in a manner that controls and optimizes the varying thermal characteristics of each of these heat exchanger types. This will increase the opportunities to use geothermal and to more cost effectively build geothermal based on the available land. It also allows the geothermal heat exchangers to be designed specifically for long term or short term storage, hot or cold storage, or direct use a.k.a. no storage such as an open loop system.

This invention also covers an alternative to said covered fluid header which is to connect every geothermal heat exchanger, heat exchanger, source/sink independently and control them independently. This would allow for full optimization and could increase efficiency even compared to the fluid header. This is due to all the same independent, direct temperature uses as described above.

The computer-based controls, in coordination with energy chassis device (FIGS. 1-2) and its embedded energy exchange unit (FIG. 4) described above, will monitor and measure heat flow into and out of the ground as well as determine the thermal response characteristics of each independent geothermal heat exchanger, alternative source/sink, to allow the system operational sequences to be optimized real time and predictive as actual performance data is measured.

Figure 10:
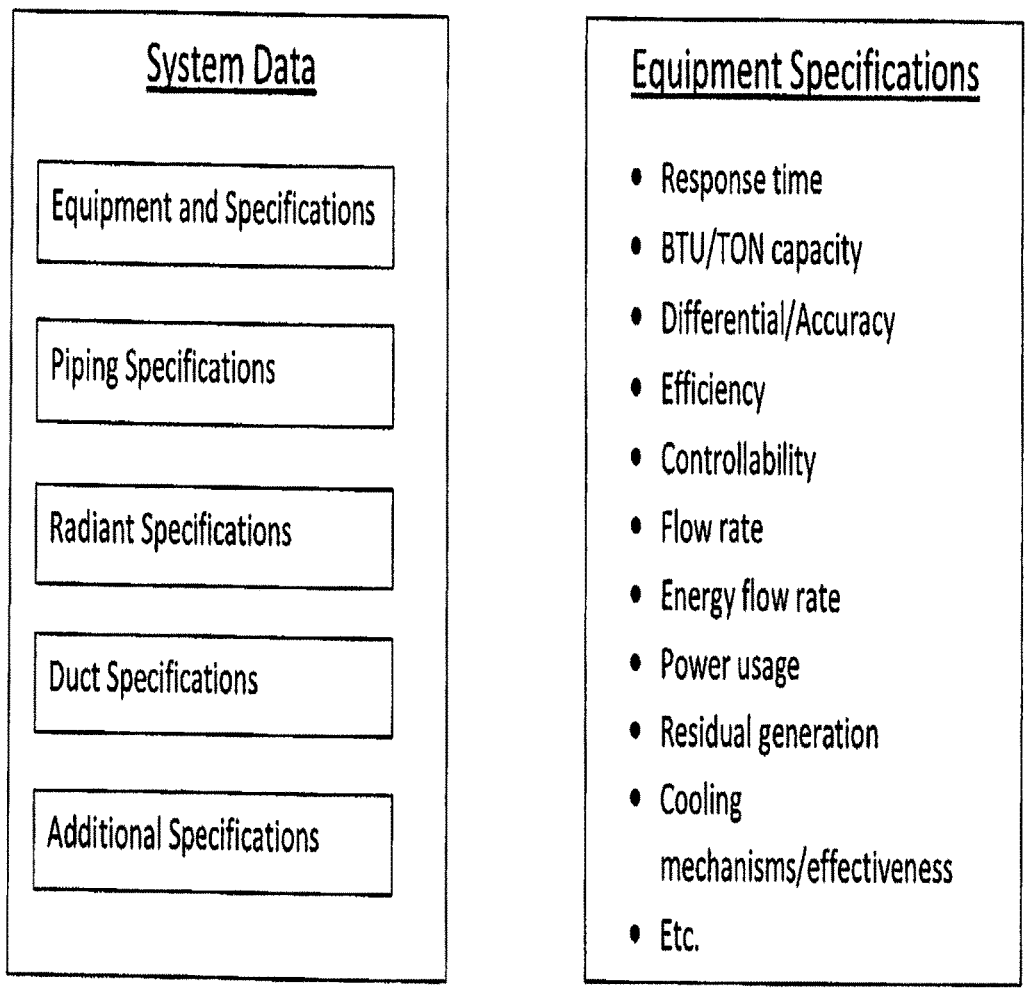
FIG. 10 shows an example of different system data and equipment specifications.

Each independent energy source and or sink has independent performance characteristics that are stored in a data base as collective data. An example is shown in FIG. 9 with present and historical performance characteristics including, energy capacity, energy decay and gain, dissipation rate, efficiency and the like. FIG. 10 shows an example of different system data and equipment specifications that are used when selecting equipment and designing the heating/cooling system for a building. The system data includes tracing the equipment used and the specification for the equipment, the piping specifications, radiant and duct specification and specifications for any other equipment connected with the system. Each piece of equipment also has specifications and operating parameters, examples of which are shown in FIG. 10.

Figure 11:
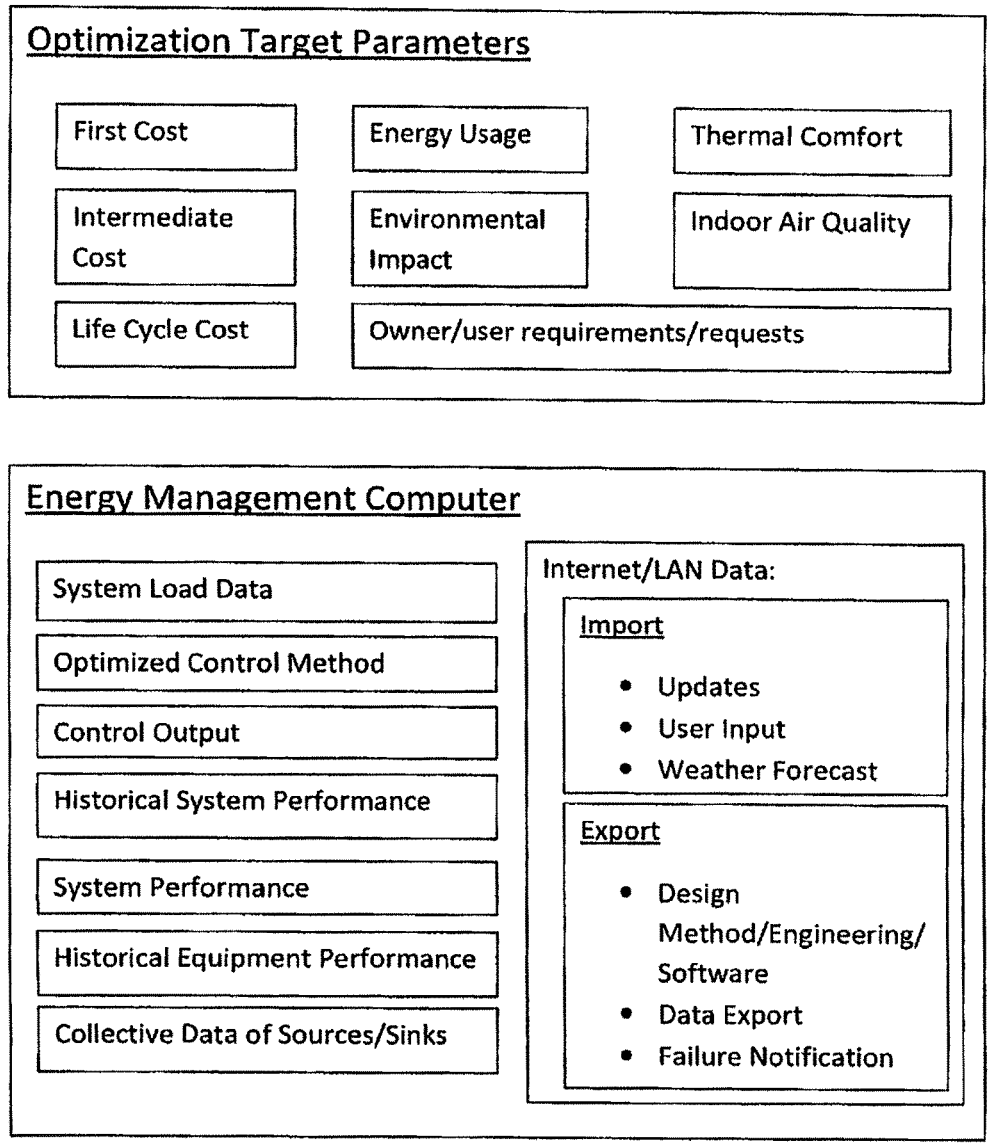
FIG. 11 shows energy management computer data types and different optimization target parameters.

FIG. 11 shows energy management computer data types and different optimization target parameters. When optimizing the system it is important to keep in mind the initial cost, intermediate cost and lifecycle cost. Other important parameters include energy usage, which effects the total cost, the impact usage has on the environment, and the value of thermal comfort and indoor air quality. Of course, owner and user requirements and requests should also be considered. The energy management computer maintains collective data of the sources and sinks available to the system, tracks system load data, and determines the optimized control method and controls the outputs. Initial system performance, historical system performance and historical equipment performance is maintained for use during system operation.

Figure 12:
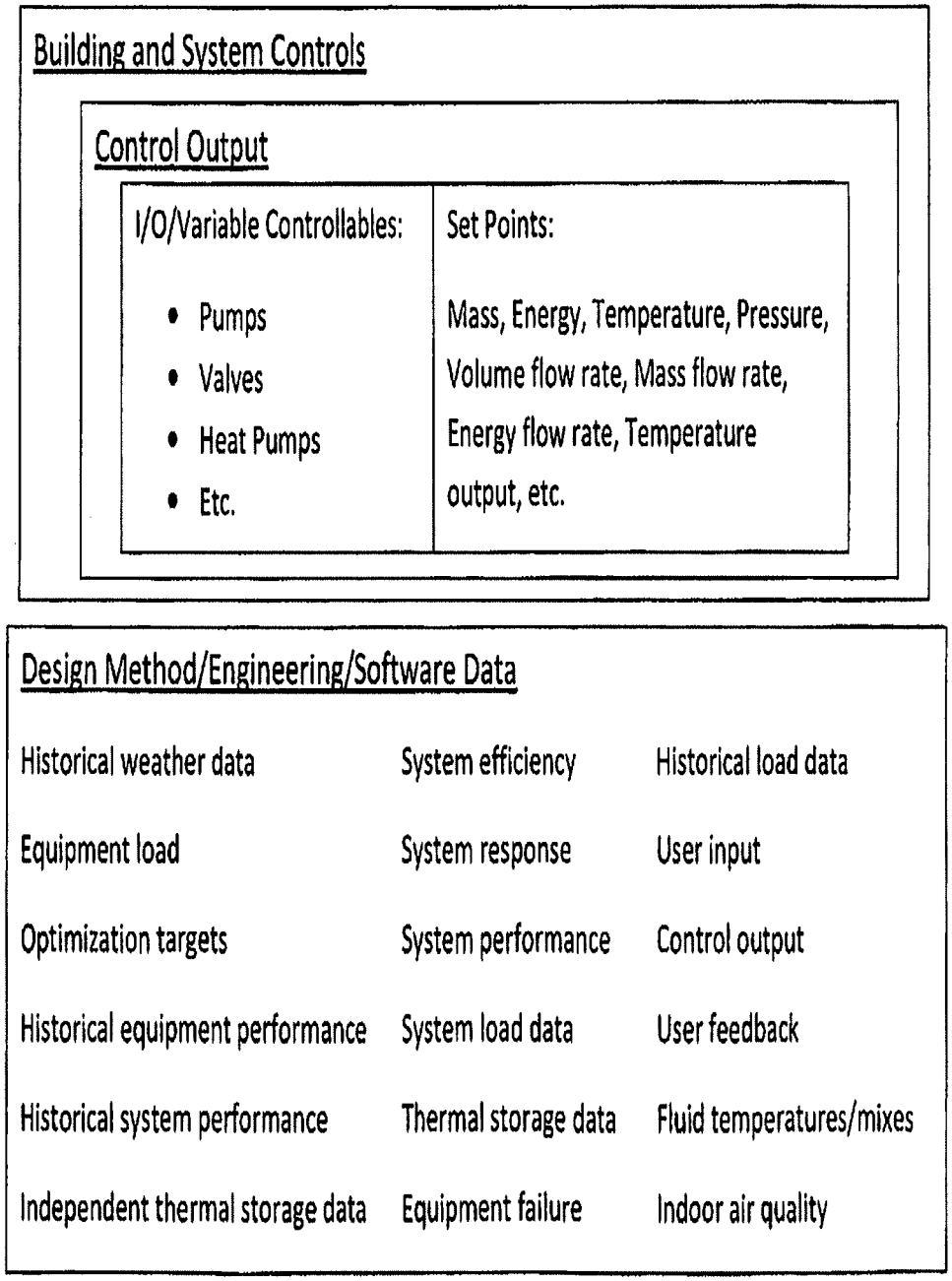
FIG. 12 shows building and system controls and examples of design method, engineering and software data.
Figure 13:
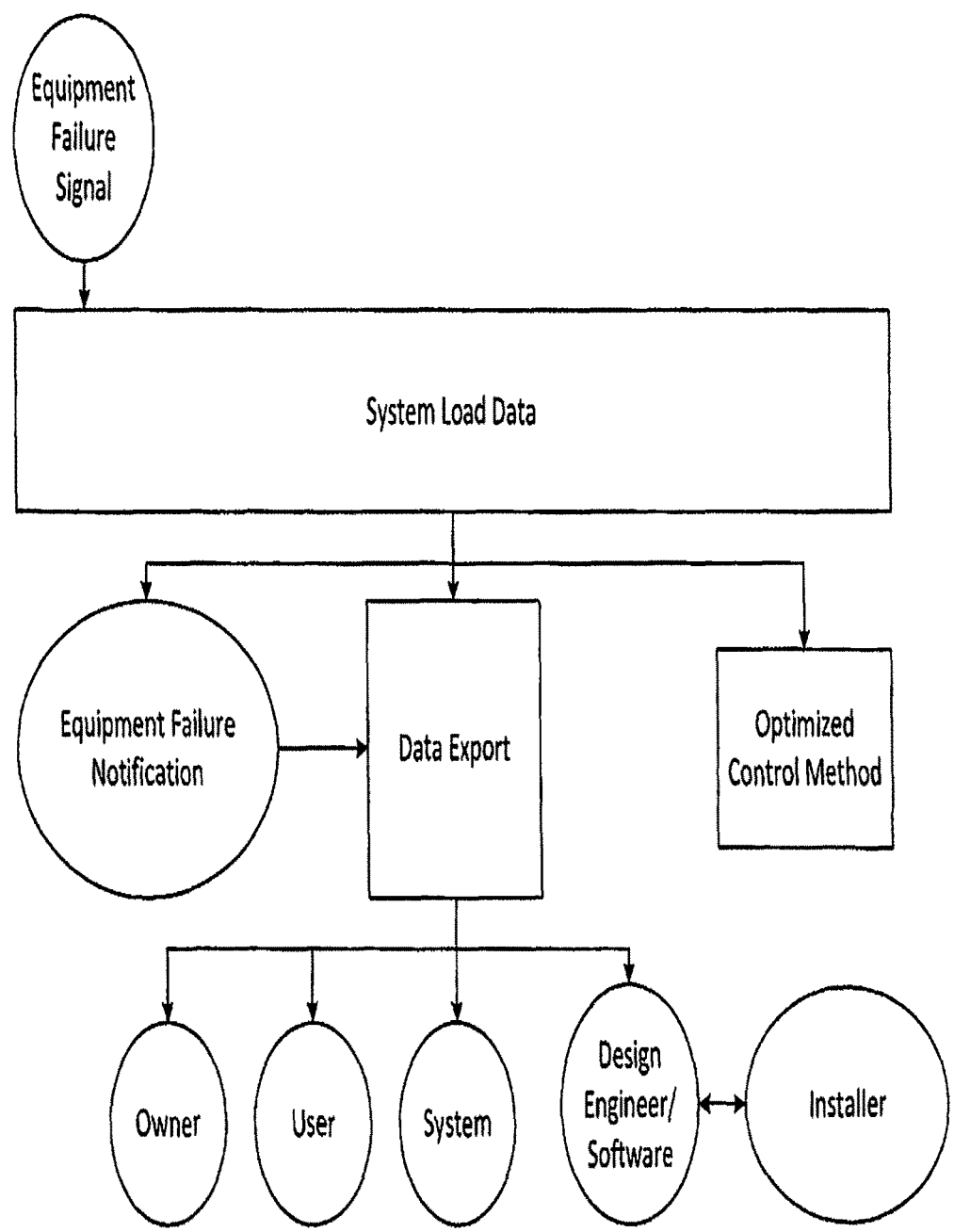
FIG. 13 is a schematic block diagram showing examples of system load signals.

FIG. 12 shows building and system controls for components with variable outputs including pumps, valves, and heat pumps to name a few and provides examples of design method, engineering and software data. FIG. 13 is a schematic block diagram showing examples of system load signals. For example, the system receives equipment failure signals and responds with equipment failure notification and the system data is communicated to the user, owner, hardware and/or software engineer, and installation specialist as appropriate.

Figure 14:
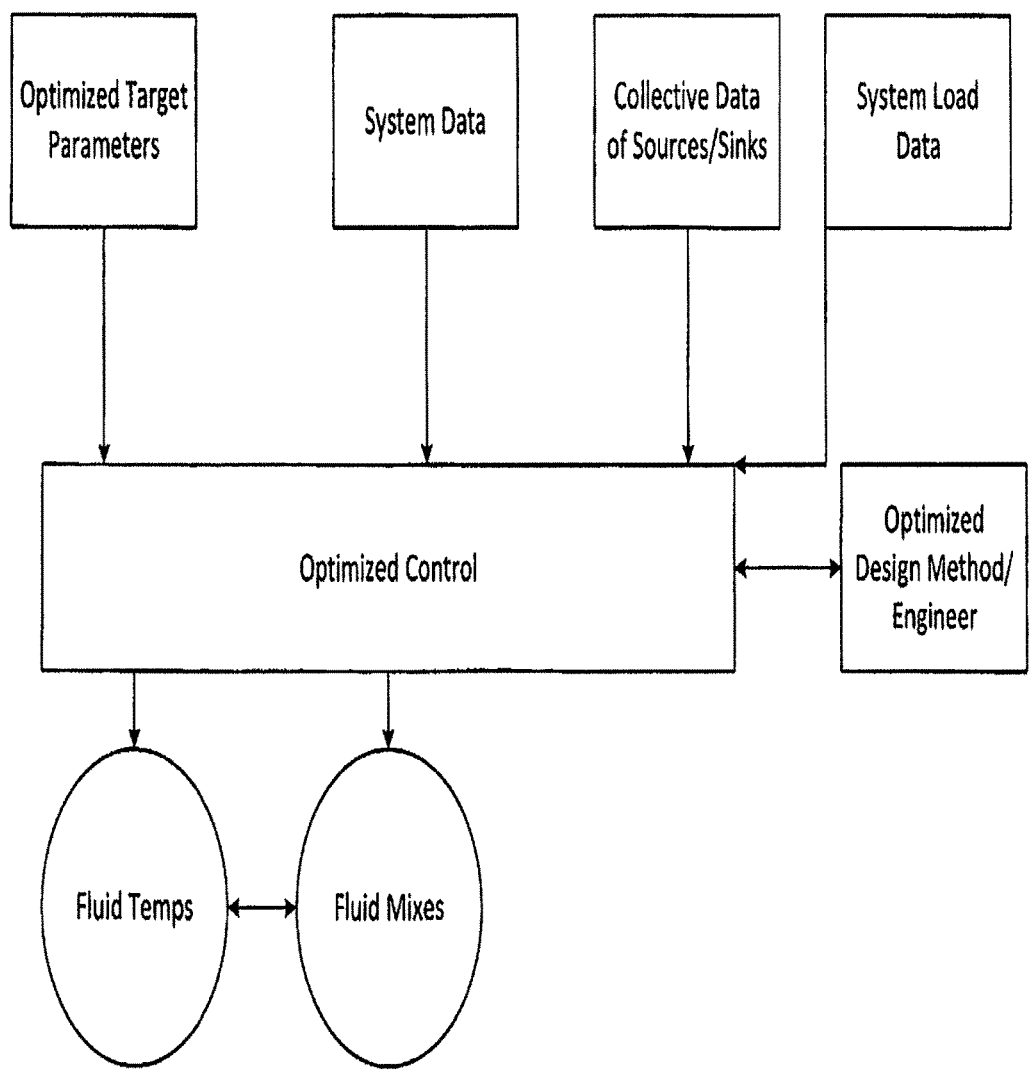
FIG. 14 is a schematic block diagram showing an example of an optimized control method.

FIG. 14 is a schematic block diagram showing an example of an optimized method for controlling the system based on inputs from the target parameters, system data, collective data related to the system sources and sinks and the system load data. Based on the collected data, control is optimized to measure fluid temperatures and mixing of fluids for optimized performance.

Figure 15:
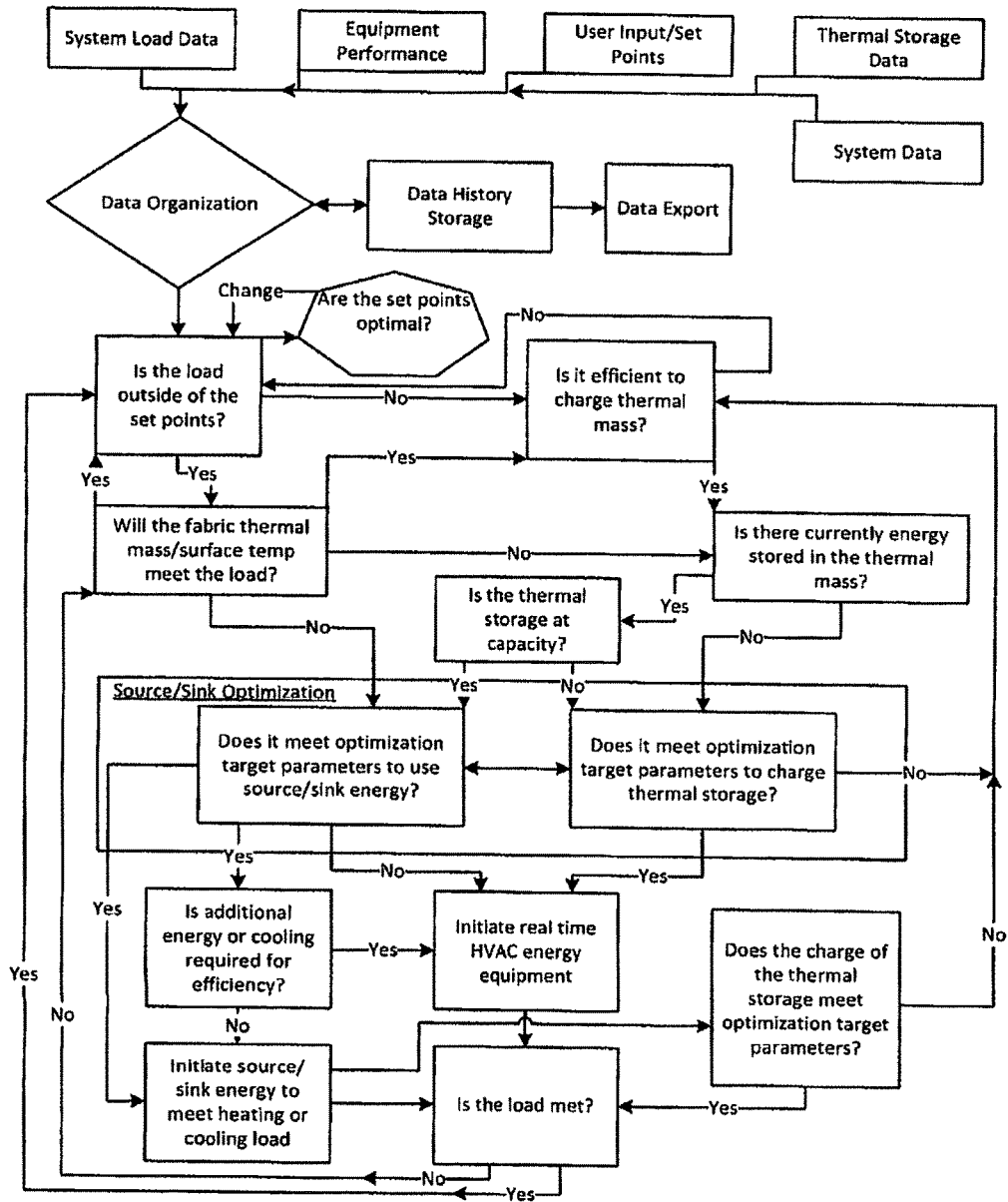
FIG. 15 is a process flow diagram showing process optimization.
Figure 16:
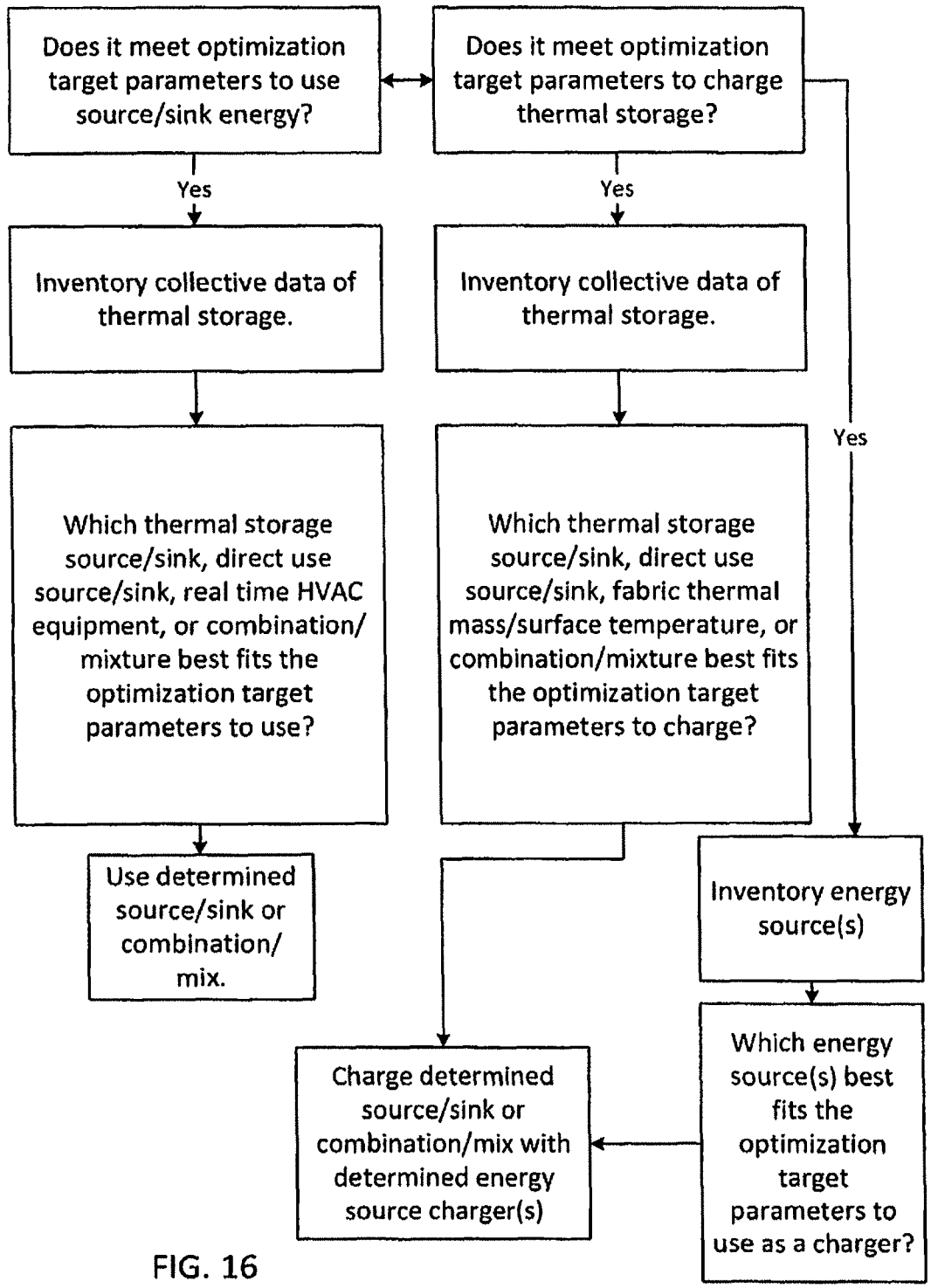
FIG. 16 is a process flow diagram showing optimization of sources and sinks.

The flow diagrams shown in FIG. 15 and FIG. 16 show the steps for optimization of the system performance to meet the needs of the occupants of the building. As shown, data is collected and stored and used to made decisions for heating and cooling of the interior space and determining if the load requirements are met. Referring to FIG. 16, the steps include determining which sources and/or sinks to use, and which sources and sinks to mix to best fill the optimization parameters.

Figure 17:
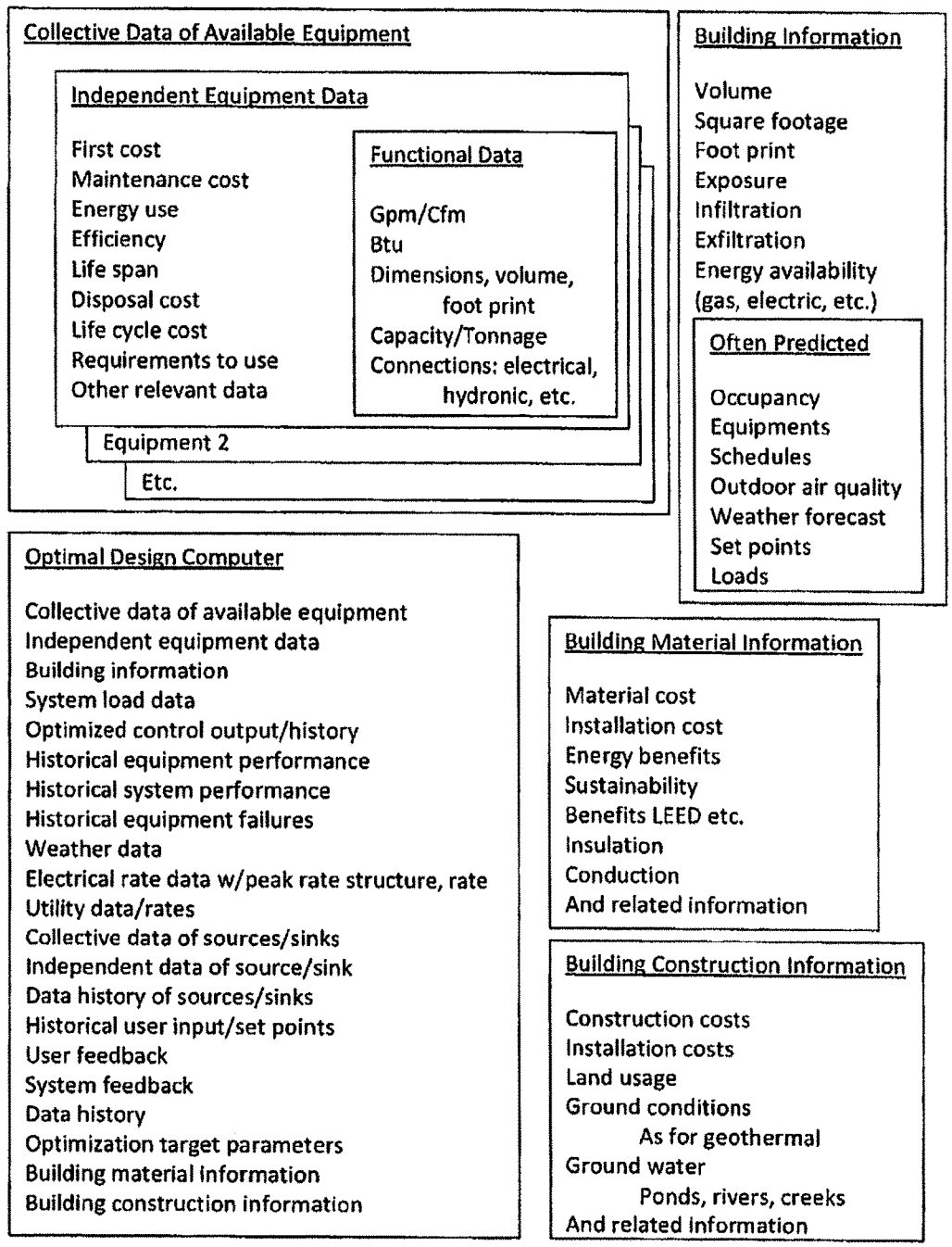
FIG. 17 shows examples of data used to design an energy chassis device and energy exchange device according to a preferred embodiment of the present invention.
Figure 18:
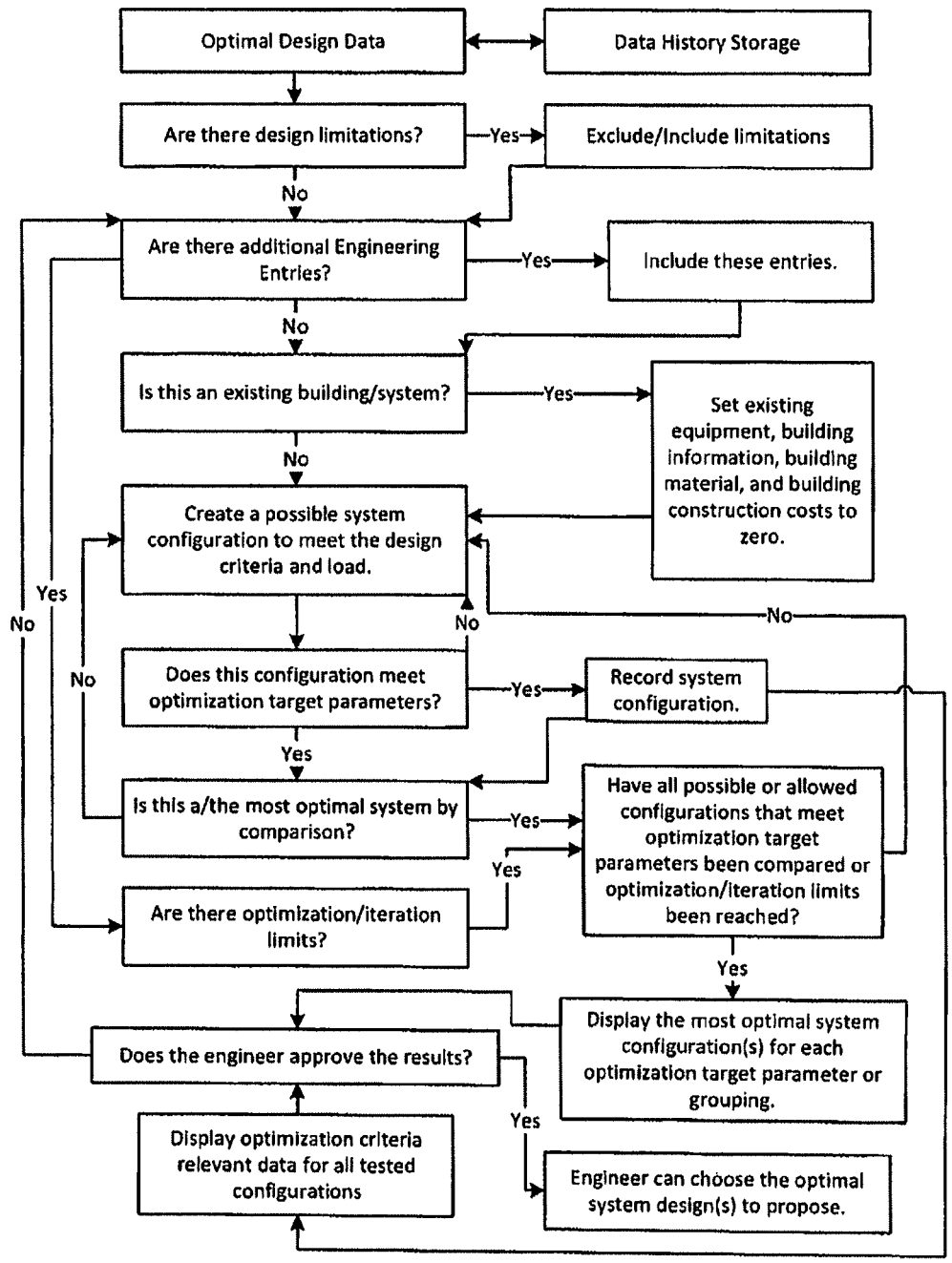
FIG. 18 is a process flow diagram showing an example of design optimization according to a preferred embodiment of the present invention.

FIG. 17 shows examples of data used to design an energy chassis device and energy exchange device according to a preferred embodiment of the present invention including independent equipment data, building material information, building construction data and shows examples of the types of data maintained on the system management computer. The examples shown are for illustration and not limitation. FIG. 18 is a process flow diagram showing an example of design optimization according to a preferred embodiment of the present invention.

Experimental Results for Energy and Cost Efficiency Analysis

System Performance and Description Summary:

The following is a simulation of a laboratory building that has been subsequently designed and is now being built for the University of Findlay. The inventors prepared a system simulation including the building envelope, HVAC, fume hood controls and lighting configuration to provide a lower life cycle cost facility that is more energy efficient compared to standard design and construction. The simulation of this system uses the techniques described in the present patent application. The result of these efforts is an integrated building energy system design that when compared to a conventional building and HVAC practices provides substantial benefits to the University of Findlay including:

100% outside air (no recirculation) to improve occupant health and safety
 Up to 68% energy cost reduction and 35% maintenance cost reduction
 Up to 76% peak electrical demand reduction
 Up to 68% building energy footprint reduction
 Up to 68% $CO_2$ emission reduction
 Annual energy and maintenance savings of approximately $1.20 per square foot of floor area
 Simple payback period of 4.3 years on the initial additional investment of $200,000

The system is based on radiant heating/cooling technology embedded within the building structure and coupled with active chilled beams. The entire system is supplied with heating and cooling fluids from a central geothermal heat pump energy plant with a geothermal earth heat exchanger. This design uses both the short term energy storage of the thermally-massive building with the seasonal energy storage of the earth heat exchanger.

When compared to a conventional HVAC System, the inventor's system has a first cost premium of approximately $200,000 based on an initial cost of $1,400,000 for the system according to the present invention versus $1,200,000 for the conventional HVAC system. These estimates do not include any potential financial incentives—there are opportunities to reduce the first cost difference via current government incentives for alternative energy systems that are not included in the cost comparisons.

Comparison to Standard HVAC System:

The inventors prepared a cost estimate and energy simulation for a standard HVAC system typical for this application, but sized to handle the significant additional requirements of the laboratory fume hoods. The HVAC configuration included a variable air volume air handling unit (the penthouse was increased in size by 800 SF to accommodate this larger unit). The air handling system was supplied hot water from a new boiler and chilled water from a new air-cooled chiller. Conditioned air was fed via ductwork to variable air volume reheat boxes which were also connected to the hot water system. Note that this conventional system recirculates air from room-to-room whereas the inventors system does not. A computer-based building automation system was included in the estimate.

Estimated energy savings for the inventors system are approximately $39,000 per year based on a standard HVAC energy cost estimate of $57,500 per year versus the inventions annual energy cost of $18,500 per year and the estimated maintenance savings are $7,500 per year based on a standard HVAC maintenance cost estimate of $21,500 per year versus a the inventions annual maintenance cost of $14,000 per year. This yields a simple payback period of approximately 4.3 years.

Description of the Building:

This project includes an approximately 40,000 square foot, two story addition to the Davis Street Facility on the University of Findlay Campus in Findlay, Ohio. Projected building use includes multiple labs with fume hoods, classrooms, faculty offices and various support spaces.

Design Process:

The inventors completed multiple energy simulations looking at various components within the building including wall construction, windows, roof insulation, lighting, and the like; tested various configurations of the invention and determined which areas were providing the best positive impact on overall energy use. Building operating schedules and projected fume hood usage were provided by University Staff. Utility rate structures were assumed to average $0.075/kWH and $10.00 per million BTU natural gas.

A base building configuration was also prepared to give us a benchmark to which to contrast the invention design. In this case the inventors followed the US Green Building Council guideline for LEED certification and used the ASHRAE 90.1-2007 Energy Conservation Standard as the baseline for their methodology. The base case building model was assumed to be fully compliant with this standard. The simulation results were quite significant, see Table 1 which shows the proposed building using ASHRAE and LEED standards showing results for invention compared to results for standard design.

TABLE 1

|  | Changing from ASHRAE 90.1-2007 Construction to the invention could save approximately | This is equal to a reduction of the following percentage |
| --- | --- | --- |
| Peak Cooling Loads (tons) | 28 | 28% |
| Peak Heating Load (MBH) | 179 | 15% |
| Peak Electrical Demand (kW) | 287 | 76% |
| Annual Electrical Usage (KWH) | 519,833 | 68% |
| Bldg Energy Footprint (KBTU/SF/Year) | 46 | 68% |
| CO2 Emissions (tonnes/tear) | 419 | 68% |
| Maintenance Costs ($/year) | 7,525 | 35% |
| Energy Costs ($/year) | 38,988 | 68% |
| Maintenance + Energy ($/year) | 46,513 | 59% |
| Net Savings in Annual Maint. & Energy Costs/SF | 1.21 | 59% |

The results in Table 1 are based on the full system with the proposed geothermal system and control options. These calculations were based on decisions made by the inventors—as those decisions change the energy model needs to be updated as well.

Energy System Configuration:

The building energy system includes the present invention; the energy chassis device that includes the energy exchange unit as shown in FIG. 5. This system monitors performance of each system component on a real time basis and in turn provides hot or chilled water to the building from the most efficient source.

The energy exchange unit monitors and controls both a combination of geothermal earth heat exchangers (this is a configuration that is unique to the invention—instead of a single, mixed-flow earth heat exchanger the present invention uses several and separate them for specific thermal applications) and other heat sources and sinks such as cooling towers and boilers.

The unique energy saving opportunity with this configuration is its ability to provide chilled water for the radiant floor and active chilled beam systems without starting a heat pump for a significant portion of the year. When in this mode, the system can deliver cooling at an Energy Efficiency Ratio (EER) that is approximately 75 to 100 versus a conventional chiller EER of 10 to 15. This allows us to provide a significant portion of the cooling at an energy consumption rate that is approximately one-seventh (1/7th) of a regular HVAC system.

The chilled or warm water is distributed via piping to both radiant cooling/heating (PEX tubing embedded in a concrete structure), active chilled beams, and reheat coils. These devices work together to provide space temperature control. Ventilation air is provided by a Dedicated Outside Air System (DOAS) located in the Penthouse Mechanical Room. This unit recovers typically wasted energy from building exhaust and uses it to pre-condition outside air used for ventilation. This system provides 100% outside air to each room—no air is recirculated from space to space. This reduces the potential for the spread of airborne contaminants and odors.

All of the above systems are controlled and optimized by a computer-based direct digital control system shown in FIG. 15. This system could also provide an energy performance "dashboard" that could be located in a public area to provide on-going feedback on building performance.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of designing a geothermal heating and cooling system to heat or cool a building, comprising:
    selecting at least one geothermal heat exchanger source;
    selecting at least one geothermal heat exchanger sink;
    predicting a thermal energy demand of the building for a selected time period;
    predicting a thermal energy loss and gain of the at least one geothermal heat exchanger source and the at least one geothermal heat exchanger sink over the selected time period to meet the predicted thermal energy demand;
    determining a cost of installing and operating the at least one geothermal heat exchanger source and the at least one geothermal heat exchanger sink based upon the predicted thermal energy loss and gain;

running, using a controller, a simulation of a heating and cooling system that includes the at least one geothermal heat exchanger source and the at least one geothermal heat exchanger sink;

optimizing, using the controller, a type, interconnectivity, or size of the at least one geothermal heat exchanger source or the at least one geothermal heat exchanger sink based upon the determined cost and the simulation; and generating, using the controller, a geothermal heating and cooling system design that includes the optimized at least one geothermal heat exchanger source and the optimized at least one geothermal heat exchanger sink.

2. The method of claim 1, wherein predicting a thermal energy demand or predicting a thermal energy loss comprises predicting expected load.

3. The method of claim 1, wherein predicting a thermal energy demand or predicting a thermal energy loss comprises predicting occupancy of the building, a usage schedule of the building, a weather forecast, or outdoor air quality.

4. The method of claim 1, wherein predicting a thermal energy demand or predicting a thermal energy loss comprises considering insulation and conduction properties of the building.

5. The method of claim 1, wherein determining a cost of installing and operating comprises considering electrical rate data.

6. The method of claim 1, wherein the building is an existing building.

7. The method of claim 1, wherein the building is designed and not constructed, and wherein determining the cost comprises determining a cost of operating existing equipment, building material costs, and building construction costs.

8. The method of claim 1, further comprising considering at least one design limitation when optimizing.

9. The method of claim 8, wherein the at least one design limitation includes land usage, ground conditions, or ground water.

10. The method of claim 1, further comprising predicting an energy efficiency of use of the at least one geothermal heat exchanger source and the at least one heat exchanger sink over the selected time period, and wherein optimizing further comprises optimizing based upon the predicted efficiency.

11. The method of claim 10, wherein optimizing based upon the predicted efficiency comprises optimizing such that an energy efficiency ratio of the at least one geothermal heat exchanger source and the at least one geothermal heat exchanger sink is between 75 and 100.

12. The method of claim 1, wherein the simulation includes an envelope of the building, fume hood controls, or lighting configuration.

13. The method of claim 1, wherein the simulation includes various wall constructions, window placement, roof insulations, or lighting configurations.

14. The method of claim 1, further comprising predicting $CO_2$ emission of the heating and cooling system when using the at least one geothermal heat exchanger source and the at least one heat exchanger sink over the selected time period, and wherein optimizing further comprises optimizing based upon the predicted $CO_2$ emission.

15. The method of claim 1, further comprising predicting a building energy footprint when using the at least one geothermal heat exchanger source and the at least one heat exchanger sink over the selected time period, and wherein optimizing further comprises optimizing based upon the predicted building energy footprint.

16. The method of claim 1, further comprising predicting a building electrical usage when using the at least one geothermal heat exchanger source and the at least one heat exchanger sink over the selected time period, and wherein optimizing further comprises optimizing based upon the predicted building electrical usage.

17. The method of claim 1, wherein determining a cost of operating comprises estimating maintenance costs and energy costs.

18. The method of claim 1, further comprising obtaining building information including the size of building, and wherein predicting a thermal energy demand of the building for a selected time period comprises predicting based upon building information.

19. A method of designing a geothermal heating and cooling system to heat or cool a building, comprising:
selecting at least one geothermal heat exchanger source;
selecting at least one geothermal heat exchanger sink;
predicting a thermal energy demand of the building for a selected time period;
predicting a thermal energy loss and gain for of the at least one geothermal heat exchanger source and the at least one geothermal heat exchanger sink over the selected time period to meet the predicted thermal energy demand;
determining a cost of installing and operating the at least one geothermal heat exchanger source and the at least one geothermal heat exchanger sink based upon the predicted thermal energy loss and gain;
predicting, using a controller, an energy efficiency of use of the at least one geothermal heat exchanger source and the at least one geothermal heat exchanger sink over the selected time period;
optimizing, using the controller, a type, interconnectivity, or size of the at least one geothermal heat exchanger source or the at least one geothermal heat exchanger sink based upon the determined cost and the predicted efficiency; and
generating, using the controller, a geothermal heating and cooling system design that includes the optimized at least one geothermal heat exchanger source and the optimized at least one geothermal heat exchanger sink.

20. The method of claim 19, wherein predicting a thermal energy demand or predicting a thermal energy loss comprises predicting expected load.

* * * * *